US009833704B2

(12) United States Patent
Owaku et al.

(10) Patent No.: US 9,833,704 B2
(45) Date of Patent: Dec. 5, 2017

(54) GAME CONTROL DEVICE, GAME CONTROL METHOD, PROGRAM, RECORDING MEDIUM, GAME SYSTEM

(71) Applicant: KONAMI DIGITAL ENTERTAINMENT CO., LTD., Tokyo (JP)

(72) Inventors: Hiroyuki Owaku, Tokyo (JP); Taku Endo, Kawasaki (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 434 days.

(21) Appl. No.: 14/567,676

(22) Filed: Dec. 11, 2014

(65) Prior Publication Data

US 2015/0148131 A1   May 28, 2015

Related U.S. Application Data

(63) Continuation of application No. PCT/JP2013/066560, filed on Jun. 17, 2013.

(30) Foreign Application Priority Data

Jun. 18, 2012  (JP) ................................ 2012-136680

(51) Int. Cl.
*A63F 13/00* (2014.01)
*A63F 13/33* (2014.01)
(Continued)

(52) U.S. Cl.
CPC ............ *A63F 13/33* (2014.09); *A63F 13/795* (2014.09); *A63F 13/80* (2014.09); *A63F 2300/558* (2013.01); *A63F 2300/5566* (2013.01)

(58) Field of Classification Search
USPC ....................................... 463/16–42
See application file for complete search history.

(56) References Cited

FOREIGN PATENT DOCUMENTS

JP   2000-325528 A   11/2000
JP   2002-143555 A   5/2002
(Continued)

OTHER PUBLICATIONS

Bandai Namco launches DS "Battle Spirits Digital Starter" dated Aug. 4, 2010.
(Continued)

*Primary Examiner* — Masud Ahmed
(74) *Attorney, Agent, or Firm* — Global IP Counselors, LLP

(57) ABSTRACT

A game control device according to the present invention includes: a correlator configured to correlate a plurality of objects with each of a plurality of users including a first user and a second user; a setter configured to set a plurality of object groups including more than one object selected from the plurality of objects correlated with each of the plurality of users for each of the plurality of users; an associator configured to associate each of the plurality of object groups set by the setter, with a group type; an executor configured to execute a battle game between an object group of the first user and an object group of the second user; a determiner configured to determine a group type of the object group of the second user before the battle game is executed; and a selector configured to select an object group of the first user from the plurality of object groups set for the first user, the object group of the first user applied to the battle game, the object group of the first user associated with the group type that is determined by the determiner.

20 Claims, 18 Drawing Sheets

(51) Int. Cl.
A63F 13/795 (2014.01)
A63F 13/80 (2014.01)

(56) References Cited

FOREIGN PATENT DOCUMENTS

| | | |
|---|---|---|
| JP | 2007-260012 A | 10/2007 |
| JP | 2011-004820 A | 1/2011 |
| JP | 2012-061059 A | 3/2012 |

OTHER PUBLICATIONS

Appli Style vol. 5 p. 7-p. 8 dated Nov. 7, 2011.
International Search Report in PCT/JP2013/066560 dated Sep. 24, 2013.

Communication terminal 10

| User ID | User name/ Display image | User characteristics | Progression level | Strength points | User IDs of friends |
|---|---|---|---|---|---|
| 000001 | KNM /XXX.jpg | $\alpha$ | Lv4 | 79 | 012345, ⋮ |
| 000002 | XXX /XXX.jpg | $\beta$ | LvX | XX | XXXXXX, ⋮ |
| ⋮ | ⋮ | ⋮ | ⋮ | ⋮ | ⋮ |

User database

FIG.6

| User ID | Owned card | Card characteristics | Warrior type | Parameter | | Offensive team configuration | Defensive team configuration | | | |
|---|---|---|---|---|---|---|---|---|---|---|
| | | | | Attack power | Defense power | | Team A | Team B | Team C | Team D |
| 000001 | C1 | α | T1 | 20 | 20 | 1 | 1 | 0 | 0 | 0 |
| | C3 | α | T3 | 15 | 15 | 1 | 0 | 1 | 1 | 0 |
| | C9 | β | T2 | 25 | 20 | 0 | 0 | 0 | 1 | 0 |
| | C12 | γ | | 30 | 35 | 1 | 1 | 0 | 1 | 0 |
| | ···· | ···· | ···· | ···· | ···· | ···· | ···· | ···· | ···· | ···· |
| 000002 | C4 | α | T1 | 20 | 20 | 1 | 0 | 1 | 1 | 0 |
| | C9 | β | T2 | 25 | 20 | 0 | 0 | 0 | 1 | 0 |
| | C12 | γ | T3 | 30 | 35 | 0 | 1 | 1 | 0 | 1 |
| | C19 | γ | T2 | 40 | 40 | 0 | 0 | 0 | 1 | 1 |
| | C21 | β | T1 | 15 | 20 | 1 | 1 | 0 | 1 | 0 |
| | C33 | α | | 35 | 30 | 1 | 1 | 0 | 0 | 0 |
| | ···· | ···· | ···· | ···· | ···· | ···· | ···· | ···· | ···· | ···· |

Card database

FIG.7

| Cards | Activated skill |
|---|---|
| C1 | 8 – 18 % DOWN in attack power of warrior cards of card characteristics α in opponent team |
| C12 | |
| ⋮ | |
| C3 | 8 – 18 % DOWN in attack power of warrior cards of card characteristics β in opponent team |
| C5 | |
| ⋮ | |
| C9 | 8 – 18 % DOWN in attack power of warrior cards of card characteristics γ in opponent team |
| C17 | |
| ⋮ | |
| C19 | 8 – 18 % DOWN in attack power of warrior cards of card characteristics type T1 in opponent team |
| C21 | |
| ⋮ | |
| C4 | 8 – 18 % DOWN in attack power of warrior cards of card characteristics type T2 in opponent team |
| C30 | |
| ⋮ | |
| C6 | 8 – 18 % DOWN in attack power of warrior cards of card characteristics type T3 in opponent team |
| C33 | |
| ⋮ | |

Skill activation table for defensive cards

FIG.8

| Team type | Condition of effect activation for opponent user (offensive team) | Activated effect |
|---|---|---|
| V1 | (Opponent user characteristics is $\alpha$) AND (Opponent team includes warrior card of card characteristics $\alpha$) | 10-20%UP in attack power of warrior cards of characteristics $\alpha$ |
| V2 | (Opponent user characteristics is $\beta$) AND (Opponent team includes warrior card of card characteristics $\beta$) | 10-20%UP in attack power of warrior cards of characteristics $\beta$ |
| V3 | (Opponent user characteristics is $\gamma$) AND (Opponent team includes warrior card of card characteristics $\gamma$) | 10-20%UP in attack power of warrior cards of characteristics $\gamma$ |
| V4 | Opponent team includes three or more warrior cards of warrior Type T1 | 5-15%UP in attack power of warrior cards of Type T1 |
| V5 | Opponent team includes three or more warrior cards of warrior Type T2 | 5-15%UP in attack power of warrior cards of Type T2 |
| V6 | Opponent team includes three or more warrior cards of warrior Type T3 | 5-15%UP in attack power of warrior cards of Type T3 |

Skill activation table for offensive teams

FIG.13

| User ID | Defensive team configuration | | | |
|---|---|---|---|---|
| | Team A | Team B | Team C | Team D |
| 000001 | V1 | V2 | V3 | V6 |
| 000002 | V6 | V5 | V4 | V1 |
| | ⋮ | ⋮ | ⋮ | ⋮ |

Team association table for defensive team

FIG.14

GAME CONTROL DEVICE, GAME CONTROL METHOD, PROGRAM, RECORDING MEDIUM, GAME SYSTEM

CROSS-REFERENCE TO RELATED APPLICATIONS

This application is a continuation of International Application PCT/JP2013/066560, with an international filing date of Jun. 17, 2013, which claims the benefit of priority of the prior Japanese Patent Application No. 2012-136680, filed on Jun. 18, 2012, the entire contents International Application PCT/JP2013/066560 and Japanese Patent Application No. 2012-136680 are incorporated herein by reference.

FIELD

The present invention relates to a technique for controlling a progress of a game for respective users.

BACKGROUND

Recently, so-called social network games have become widespread as applications executable in a social networking service (SNS).

According to the social network games, besides collaborative play with other users (friends), users exchange information through communication with friends such as greetings and contacts, and give or exchange items in the game with friends. As an example of the social network games, a digital card game (Dragon collection (registered trademark)) is disclosed in a Japanese game magazine "Appli Style, Vol. 5 (Eastpress Co., Ltd.) p. 7-8."

SUMMARY OF THE INVENTION

Extremely many users participate in a social network game as described above. A battle between two users in the social network game is performed asynchronously. For example, in the social network game, respective users set an offensive card group and a defensive card group from cards that the respective users own (so called "make a card deck"). Here, a user who is accessing to the game starts a battle against other user by use of the offensive card group. The other user who is attacked in the battle (namely, an opponent user) fights back by the defensive card group that has been set; however, the other user cannot perform any operations that can be influential to a battle result. The user who is accessing to the game and started the battle can recognize the battle result immediately, while the other user recognizes the battle result after the other user accesses to the game.

In such a battle performed asynchronously, an offensive user who is accessing to the game is able to select an opponent user (select a level or a characteristics of an opponent user, for example). That user may be also able to borrow a card of his or her friend and let the card participate in the battle. Therefore, an offensive user has an advantage, which causes imbalance between the offensive user and the opponent user in the battle.

The present invention has been devised in consideration of the above. An object of the present invention is to provide a game control device, a game control method, a program, a recording medium, and a game system that reduce imbalance between users in a battle game.

An aspect of the present invention is a game control device including:

a correlator configured to correlate a plurality of objects with each of a plurality of users including a first user and a second user;

a setter configured to set a plurality of object groups including more than one object selected from the plurality of objects correlated with each of the plurality of users for each of the plurality of users;

an associator configured to associate each of the plurality of object groups set by the setter, with a group type;

an executor configured to execute a battle game between an object group of the first user and an object group of the second user;

a determiner configured to determine a group type of the object group of the second user before the battle game is executed; and a selector configured to select an object group of the first user from the plurality of object groups set for the first user, the object group of the first user applied to the battle game, the object group of the first user associated with the group type that is determined by the determiner.

In this game control device, the determiner may determine the group type of the object group of the opponent user, based on at least one of registration information of the opponent user, and an object or a combination of objects included in the object group of the opponent user.

In this game control device, the setter may vary a number of the object groups, each possible to be set, depending on a progression status of the user.

In this game control device, the executor may execute the battle game irrespective of whether the user is logged into the battle game, and the determiner may determine the group type of the object group of the opponent user while first user is logged into the battle game.

In this game control device, the associator may vary a number of the group types, each possible to be associated with each of the plurality of object groups, depending on a progression status of the user.

In this game control device, the associator may associate each of the plurality of object groups with a group type selected from the plurality of group types, based on input information by the user.

BRIEF DESCRIPTION OF THE DRAWING

Referring now to the attached drawings which form a part of this disclosure:

FIG. 6 illustrates an exemplary configuration of a user database.

FIG. 7 illustrates an exemplary configuration of a card database.

FIG. 8 illustrates an exemplary configuration of a skill activation table for defensive cards.

FIG. 13 illustrates an exemplary configuration of a skill activation table for offensive teams.

FIG. 14 illustrates an exemplary configuration of a team association table for a defensive team.

DETAILED DESCRIPTION OF THE EMBODIMENTS

The embodiment of the present embodiment will be described below.

(1) Configuration of Game System

Figure 1:
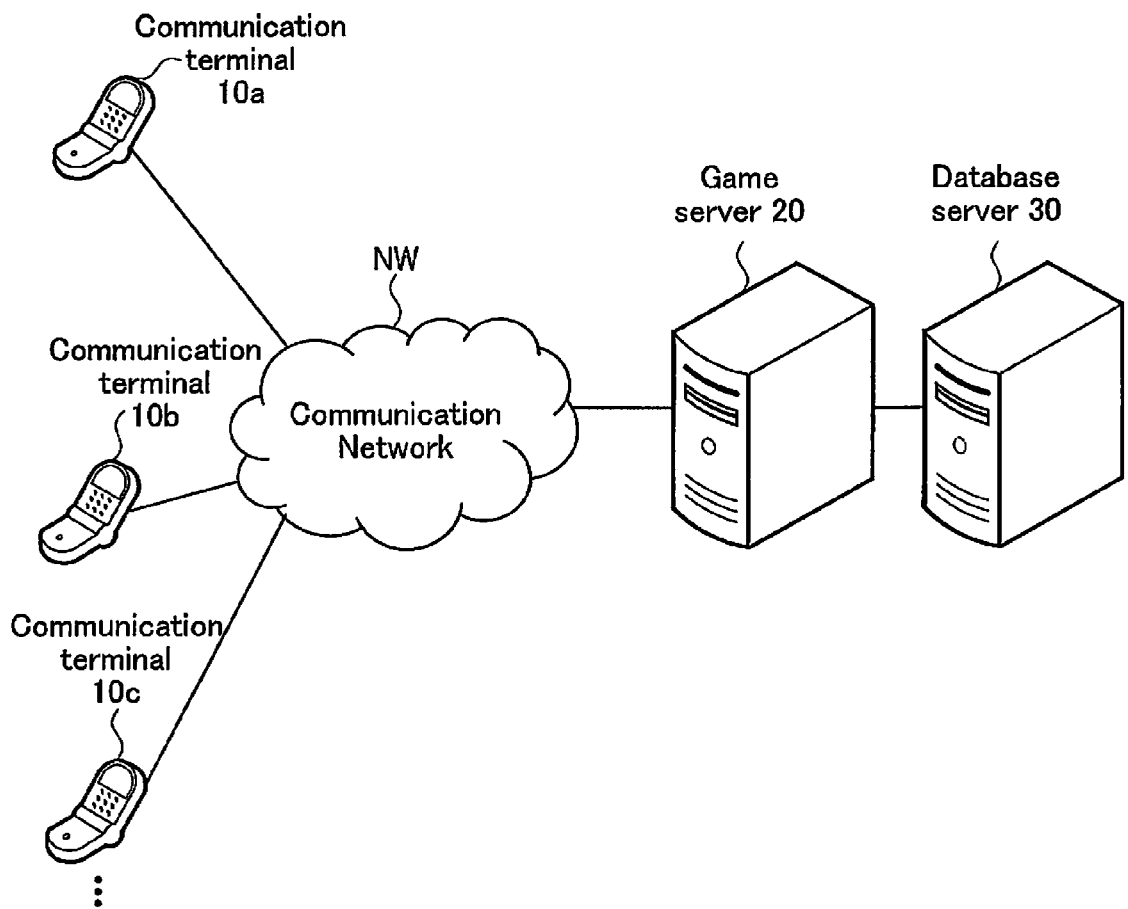
FIG. 1 illustrates a basic configuration diagram of a game system according to an embodiment.

FIG. 1 illustrates an exemplary system configuration of a game system according to embodiments. As illustrated in FIG. 1, the game system includes a plurality of communication terminals 10a, 10b, 10c and etc. that are connectable to a communication network NW such as the Internet, a game server 20 that is connectable to the communication network NW, and a database server 30. Each of the communication terminals 10a, 10b, 10c and etc. is a communication terminal operated by an individual user, such as a mobile terminal, a smartphone, a personal digital assistant (PDA), a personal computer, or a television receiver including a two-way communication function (including a so-called multi-functional smart TV). It should be noted that the communication terminals 10a, 10b, 10c and etc. may be hereinafter collectively referred to as "communication terminal(s) 10."

With this game system, the game server 20 is configured to be able to communicate with the communication terminal 10 as a client. The game server 20 provides the communication terminal 10 with gaming service. The game server 20 is embedded with an application operable on a web browser as a game application in the game system. The database server 30 stores a variety of information for executing the games as described below. The database server 30 is connected to the game servers 20 by means of a wired connection for example for reading and writing the information.

The communication terminal 10 includes a web browser that is able to display a web page provided by the game server 20. A user plays a game by performing an operation on the web page displayed on the communication terminal 10.

In addition to the game server 20, an authentication server may be provided for authenticating respective users of the communication terminals 10, although not illustrated in FIG. 1. Further, if providing a plurality of the game servers 20 for receiving accesses from a large number of the communication terminals 10, a load balancer may be provided for regulating loads among the plurality of game servers 20. Furthermore, the game server 20 may be configured as a single server device or as a plurality of server devices to which functions are distributed.

(2) Communication Terminal Configuration

The communication terminal 10 will be hereinafter explained with reference to FIGS. 2A, 2B, and 3.

Figure 2A:
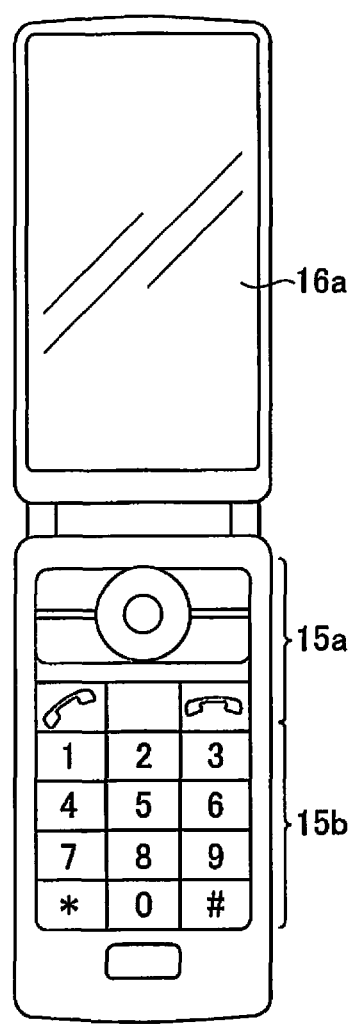
FIG. 2A illustrates an external appearance example of a communication terminal according to the embodiment.
Figure 2B:
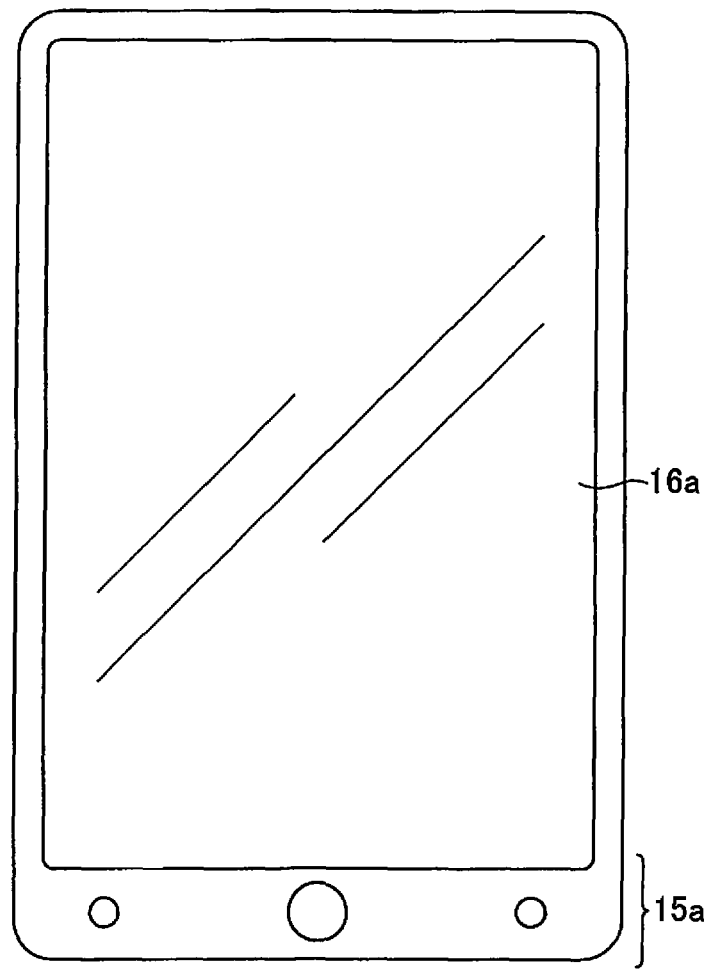
FIG. 2B illustrates an external appearance example of a communication terminal according to the embodiment.

FIGS. 2A and 2B illustrate exemplary appearances of the communication terminal 10. FIG. 2A illustrates a communication terminal with a button input system such as a foldable communication terminal (mobile telephone). FIG. 2B illustrates a communication terminal with a touch panel input system such as a smartphone. FIG. 3 is a configuration block diagram of the communication terminal 10.

Figure 3:
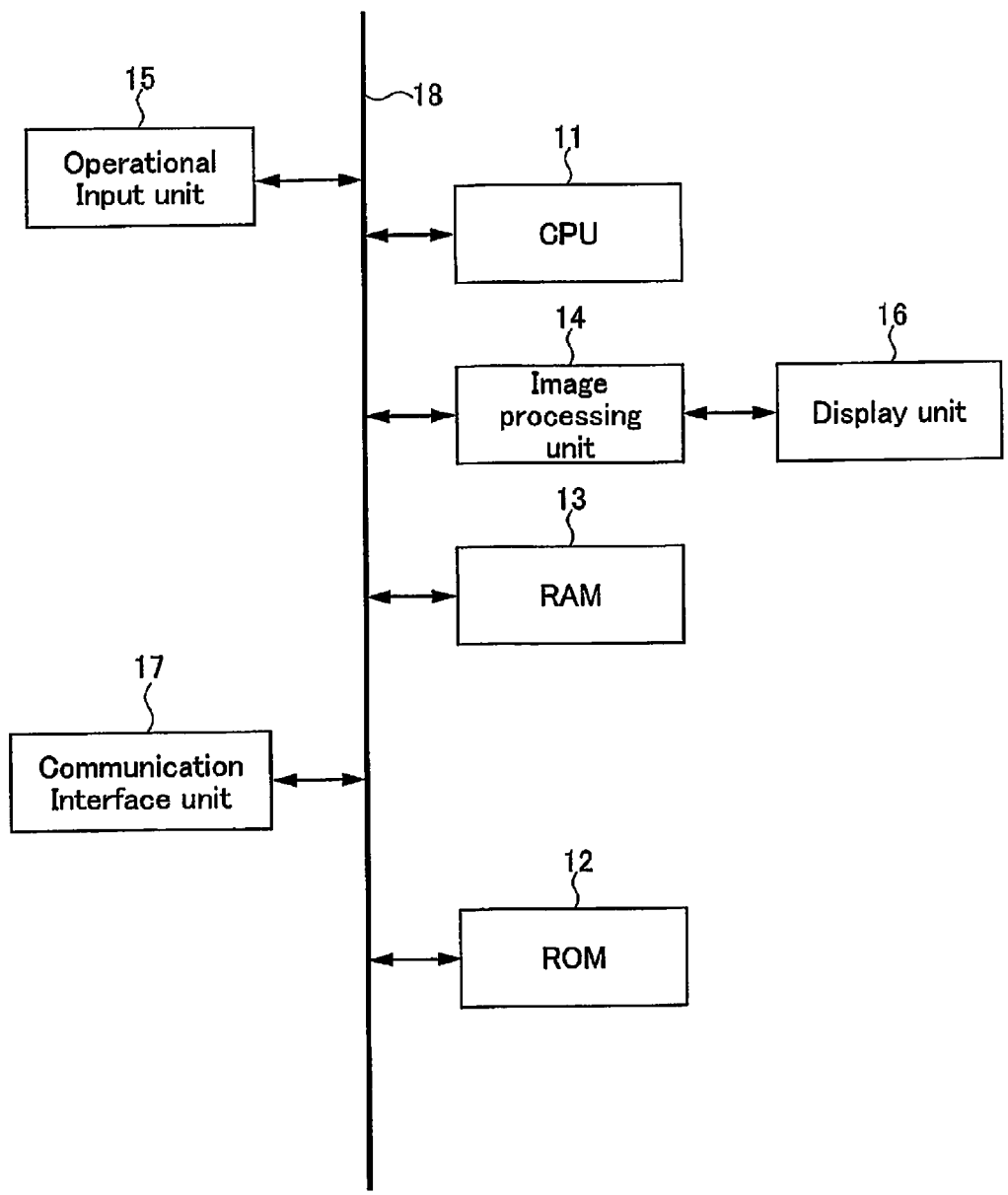
FIG. 3 is a block diagram of a configuration of a communication terminal according to the embodiment.

As represented in FIG. 3, each communication terminal 10 includes a central processing unit (CPU) 11, a read-only memory (ROM) 12, a random access memory (RAM) 13, an image processing unit 14, an operational input unit 15, a display unit 16, and a communication interface unit 17 as a signal reception unit. Further, each communication terminal 10 includes a bus 18 for transmitting control signals or data signals among the components.

The CPU 11 loads a web browser stored in the ROM 12 into the RAM 13 and runs the web browser therein. The CPU 11 acquires data for displaying a web page from the game server 20 through the communication interface unit 17 on the basis of an appropriately specified uniform resource locator (URL) that is inputted by a user using the operational input unit 15 and the like. The acquired data is data of objects such as images associated with a hypertext markup language (HTML) document and the HTML document (hereinafter collectively referred to as "HTML data" on an as-needed basis). The CPU 11 then interprets the acquired HTML data. It should be noted that each communication terminal 10 may be embedded with a variety of plug-ins for extending browsing functions of the web browser.

In acquiring the HTML data, the CPU 11 transmits an access request message to the game server 20 through the communication interface unit 17. The access request message herein includes either a preliminarily registered user ID (user identification information) or a user ID inputted through the operational input unit 15.

The web browser displays on the display unit 16 a web page provided by the game server 20 through the image processing unit 14 on the basis of the acquired HTML data. Further, when either a Hyperlink or a button on the web page is selected by a user operating the operational input unit 15, the web browser sends a request to the game server 20 (that is, a request for updating a web page; HTTP request) to transmit new HTML data for displaying the web page in accordance with the selection.

The image processing unit 14 displays a web page on the display unit 16 on the basis of image data for display to be provided from the CPU 11 as an analysis result of the HTML data. For example, the display unit 16 is a liquid crystal display (LCD) monitor including thin-film transistors arranged in a matrix manner on a pixel-by-pixel basis. The display unit 16 displays the image of the web page by driving the thin-film transistors on the basis of the image data for display on a display screen 16a.

In the case in which the mobile terminal 10 is a communication terminal to which a button input method (see FIG. 2A) applies, the operational input unit 15 is equipped with a button group 15a and a button group 15b. The button group 15a includes a plurality of operational input buttons such as a directional instruction button and a confirmation button for receiving user operational inputs. The button group 15b includes a plurality of operational input buttons such as an alphanumeric keypad and the like. The operational input unit 15 also includes an interface circuit for recognizing pressing (operating) the buttons as inputs and outputting the inputs to the CPU 11. For example, the direction instructional button is provided for instructing the CPU 11 to scroll and display a web page displayed on the display unit 16. The confirmation button is provided for instructing the CPU 11 to select one of a plurality of hyperlinks or buttons displayed on a web page. The selected hyperlink or button may be activated (e.g., highlighted). When the communication terminal 10 is a small portable terminal, the aforementioned buttons are preferably disposed on the front face of the communication terminal 10 to allow a user to easily operate (click) the buttons with the thumb of the hand holding the communication terminal 10. In the example illustrated in FIG. 2A, the button group 15b is arranged below the button group 15a and includes a plurality of operational input buttons depicted as "0" to "9", "*", "#" (an alphanumeric keypad).

In the case in which the mobile terminal 10 is a communication terminal to which a touch panel input method (see FIG. 2B) applies, the operational input unit 15 receives inputs inputted by mainly touching the display screen 16a with a finger or a pen. The touch panel input method may be a known method such as a capacitance method. As illustrated in FIG. 2B, the communication terminal 10 may be provided with a button group 15a despite having the touch panel input method.

In the case in which a button input method applies to the mobile terminal 10 for example, a selection operation of a button on a web page displayed on the communication terminal 10 is performed by the following steps: selecting a button on the web page with a pressing operation of the direction instructional button and subsequently confirming the selected button with a pressing operation of the confirmation button. In the case in which a touch panel input method applies to the mobile terminal 10 for example, the selection operation is conducted by indicating (touch operation) with a finger or pen a position of a button on the display screen 16a on which the web page is displayed.

(3) Game Server Configuration

Figure 4:
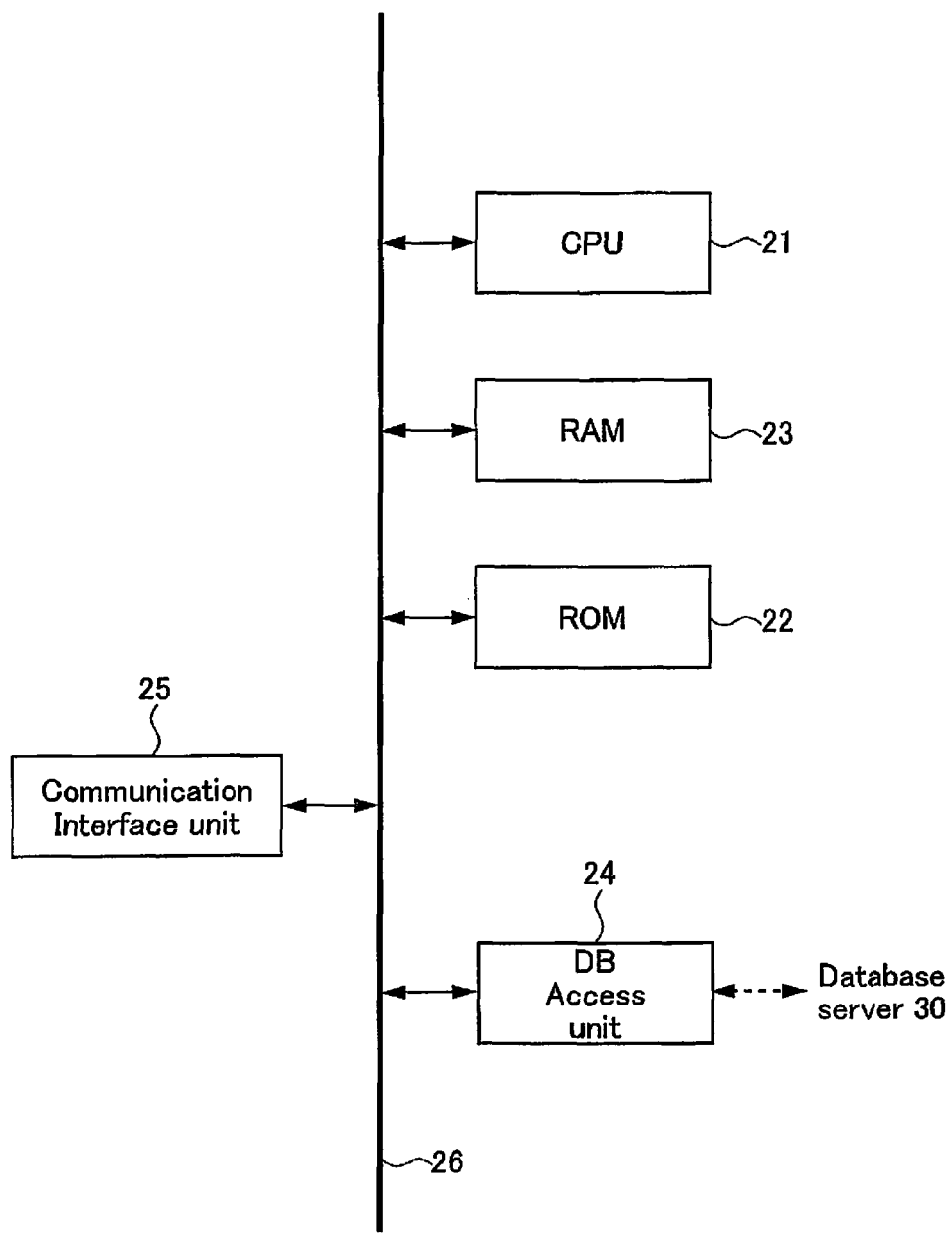
FIG. 4 is a block diagram of a configuration of a game server according to the embodiment.

The configuration of the game server 20 will be explained with reference to FIG. 4

For example, the game server 20 manages a website of a game including a plurality of hierarchically structured web pages. The game server 20 provides a web service of the game to the communication terminals 10. As illustrated in FIG. 4, the game server 20 includes a CPU 21, a ROM 22, a RAM 23, a database (DB) access unit 24, and a communication interface unit 25. Further, the game server 20 includes a bus 26 for transmitting control signals or data signals among the components. It should be noted that the game server 20 may have the same hardware structure as general-purpose web servers.

The ROM 22 stores an application program that provides the service of displaying a HTML document and objects such as images (i.e., displaying a web page) to the web browser of the communication terminal 10 as a client. A variety of data referenceable by the CPU 21 is stored in the ROM 22 in addition to the application program.

The CPU 21 loads a game program stored in the ROM 22 into the RAM 23 and runs the loaded game program. The CPU 21 also performs a variety of processing through the communication interface unit 25.

For example, the CPU 21 communicates with the web browser the communication terminal 10 according to HTTP through the communication interface unit 25. For example, the CPU 21 performs data processing and computation based on a HTTP request (including a user's selection result of a hyper link or a button on a web page, for example) received through the communication interface unit 25 from the communication terminal 10. The CPU 21 returns a HTTP response including a processing result to the communication terminal 10. The HTTP response includes HTML data for updating a web page. In the case in which the game server 20 is supposed to perform authentication processing for a user of the communication terminal 10, the CPU 21 performs the authentication processing.

The database access unit 24 is an interface used when the CPU 21 performs data reading and data writing with respect to the database server 30.

(4) Database Server Configuration

The database server 30 as a memory device can be realized by a general-purpose storage such as a high-capacity hard disk drive, a redundant array of inexpensive disks (RAID) or other form of device. Databases inside the database server 30 are configured to allow reading and writing of data by the CPU 21 through the database access unit 24 of the game server 20.

Figure 5:
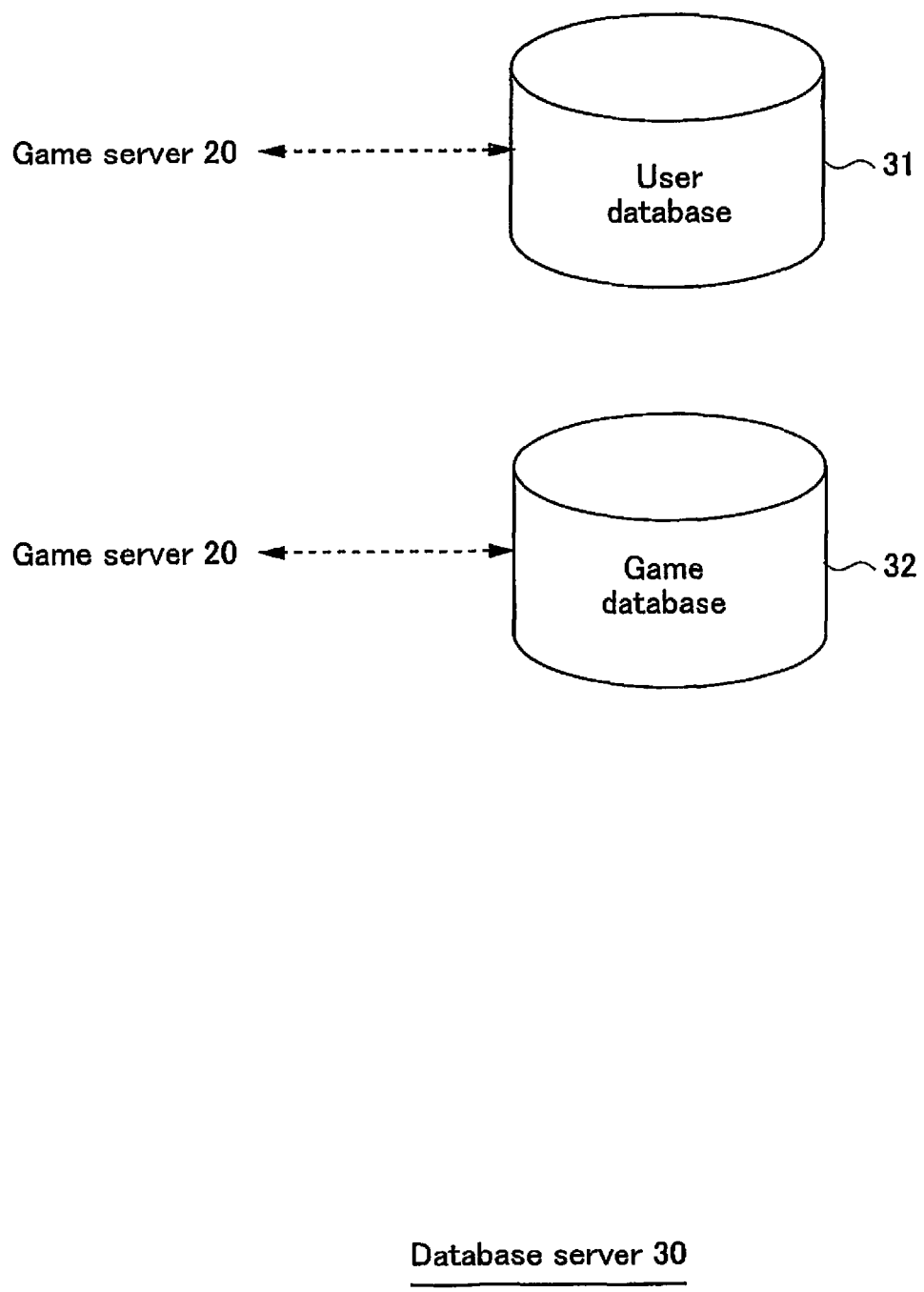
FIG. 5 is a block diagram of a configuration of a database server according to the embodiment.

FIG. 5 illustrates an example of a database server 30 configuration. As illustrated in FIG. 5, the database server 30 includes a user database 31 and a game database 32.

The game executed by the game server 20 of the present embodiment is not limited to a game of a specific type. For convenience sake of the following explanation, a battle-type digital card game will be considered as an exemplary game. The battle-type digital card is configured such that a user plays a battle by use of warrior card(s) that the user virtually owns in the game. This digital card game is provided with quest processing for searching an area so that a user collects his or her own warrior cards, and with battle processing for executing a battle between teams of warrior cards of two users.

FIG. 6 illustrates an exemplary configuration of a user database 31 that is applied to the game of the above-described battle-type digital card game (which may be referred to as "the game" or "the game of the present embodiment" hereinafter). In this example, the user database 31 includes for each user ID (user identification information): User Name/Display Image, User characteristics, Progression level, Strength points, and User ID of friends. Information included in the user database 31 may be updated by the game server 20.

In the following explanation, data for each user ID or for each user name (which is explained below) that identifies a user included in the user database 31 is referred to collectively as "user data." The data of the fields that configure the user data are described below.

User Name/Display Image

"User Name/Display Image" represents a user name and a display image displayed for identifying a user of the communication terminal 10 while executing the game. The user name is a text of a certain length or less specified in advance by the user. The display image is, for example, an avatar image selected in advance by the user. The user name is a name to identify a user in a network environment (or a game community) provided by the game server 20.

User Characteristics

"User characteristics" represents a characteristics that a user designates at the time of user registration in the game of the present embodiment. In an example of the game of the present embodiment, the user characteristics may be α, β, or γ.

Progression Level

"Progression level" represents data indicating a degree of progression of a user in the game. The progression level increases as the user progresses the game. For example, the progression level a value ranging from Lv1 (Level 1) to Lv100 (Level 100).

Strength Points

"Strength points" are points that are required in performing a quest, which will be described later, in the game of the present embodiment. The strength points decrease as the quest is performed, while the strength points recover (increase) each time a certain period of time elapses.

User ID of Friends

"User ID of friend(s)" indicates user ID(s) of friend(s) of a user (that is, user ID(s) of the other user(s) who are associated with the user).

Referring now back to FIG. 5, the game database 32 records and updates information with regard to progression of the game executed by the game server 20. The information with regard to progression of the game may include various types of information depending on nature of the game. In the game of the present embodiment, that information may include battle results between users. The game database 32 further records a card database and a skill activation table for defensive cards.

FIG. 7 illustrates an example of a card database. As illustrated in FIG. 7, the card database includes, for each user ID, information with regard to owned cards by respective users (that is, warrior cards correlated with respective users). Each of the owned cards is associated with a card characteristics, a warrior type, and parameters (attack power, defense power). Although not illustrated in FIG. 7, each of the owned cards may be associated with image data that is referred to display image in the game.

The card characteristics represents a characteristics that corresponds to the user characteristics. In an example of the present embodiment, like the user characteristics, the card characteristics is one of α, β, and γ. All warrior cards are not necessarily set to any card characteristics. As will be described later, it is configured in the present embodiment such that, if a user starts a battle by use of a warrior card whose card characteristics is the same as a user characteristics of the user, attack power of the warrior card increases.

The warrior type represents a type of a warrior card. In an example of the present embodiment, the warrior type is one of T1, T2, and T3. As will be described later, it is configured in the present embodiment such that, if a user starts a battle by use of a predetermined number of warrior cards of the same warrior type, three warrior cards of the same warrior type for example, attack power of the warrior card increases.

The parameters (attack power, defense power) are values that are referred to in determining a result of a battle using warrior cards.

In the game of the present embodiment, the battle processing between users starts when an operational input is performed to the communication terminal 10 by a user who is logged into the game. At a time when the user selects an opponent user, the opponent user is not necessarily logged into the game. Therefore, the battle processing of the present embodiment will be performed as follows. In the case in which a user accessing to the game performs battle processing, that user is supposed to be a side starting a battle, that is, an offensive side against the opponent user by use of an offensive team of warrior cards. On the other hand, a user selected as the opponent user is supposed to be a side accepting the battle, that is, a defensive side using a defensive team of warrior cards. In this case, a defensive user cannot perform any operation that can be influential to capability of the defensive team during execution of a battle started by the above-described user.

In the following description, a user of the offensive side is referred to as "offensive user", while a user of the defensive side is referred to as "defensive user."

The card database illustrated in FIG. 7 includes flags for each of owned cards by respective users. Each of the flags indicates whether the corresponding owned card is set in (that is, belongs to) an offensive team and/or a defensive team. "1" of the flag indicates the corresponding owned card is set, while "0" of the flag indicates the corresponding owned card is not set. In an example of the present embodiment, defensive team configuration is comprised of four defensive teams A to D.

FIG. 8 illustrates a skill activation table for defensive cards. Provided in the game of the present embodiment are warrior cards whose skills are activated with a fixed or a randomly determined probability, when the warrior cards participates in a battle. Note that warrior cards and the corresponding activated skills are not limited to those illustrated in FIG. 8. FIG. 8 exemplifies a skill activation table for defensive cards, while a skill activation table for offensive teams may be provided.

The skill activation table in FIG. 8 indicates a skill of a warrior card that is activated in a battle, in the case in which the warrior card is set in a defensive team in the battle. For example, in the case in which a warrior card C1 is set in a defensive team, a skill is activated which decrease in attack power of warrior cards of card characteristics α that is included in an opponent user (that is, an offensive team of an offensive user). The decreased amount of the attack power is randomly determined in a range of 8 to 18% for example. In the case in which a warrior card C19 is set in a defensive team, a skill is activated which decrease in attack power of warrior cards of type T1 that is included in an opponent user (that is, an offensive team of an offensive user). The decreased amount of the attack power is randomly determined in a range of 8 to 18% for example.

(5) Game According the Present Embodiment

Figure 9:
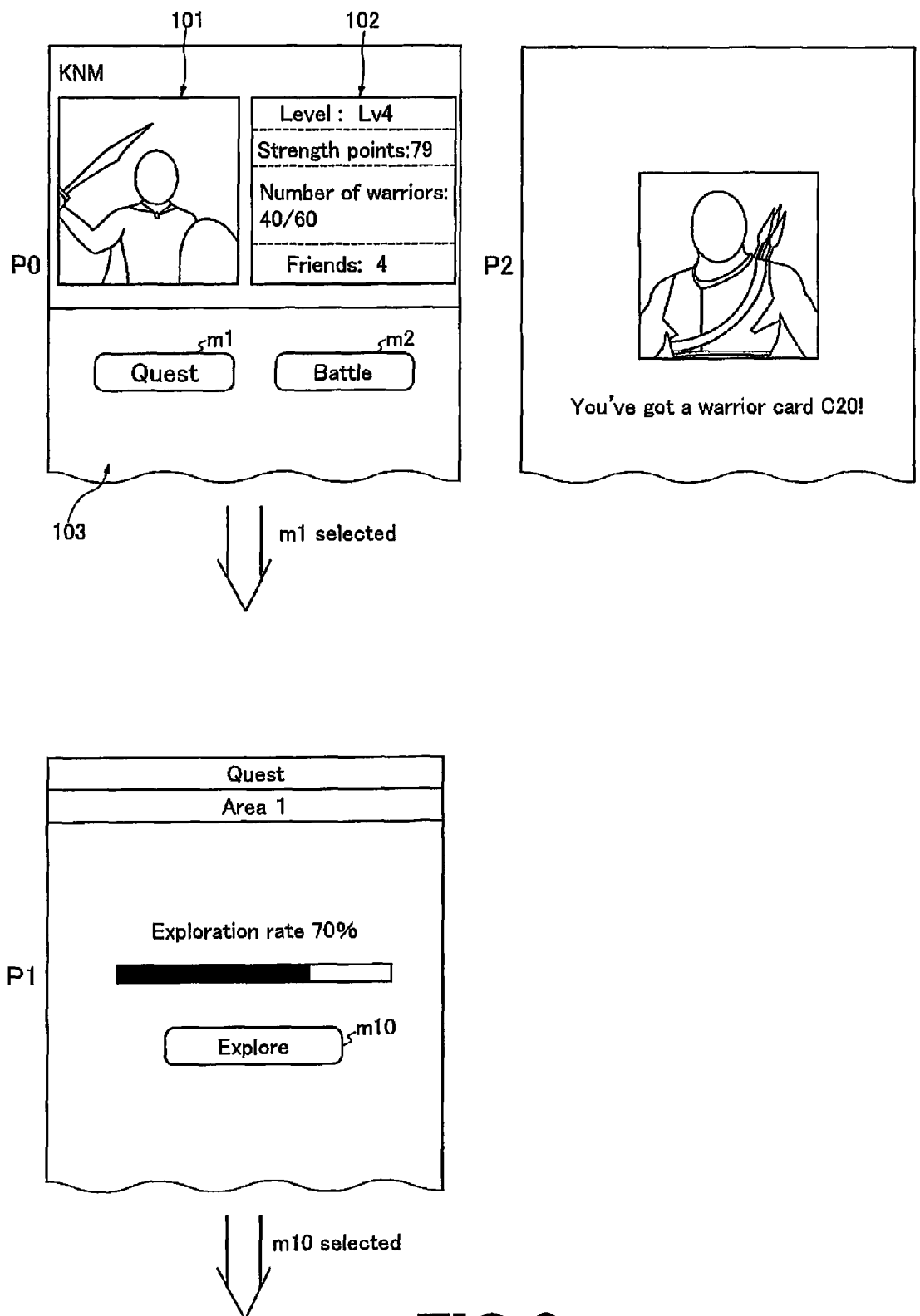
FIG. 9 illustrates an example of a series of web pages that are displayed on the communication terminal of a user.
Figure 10:
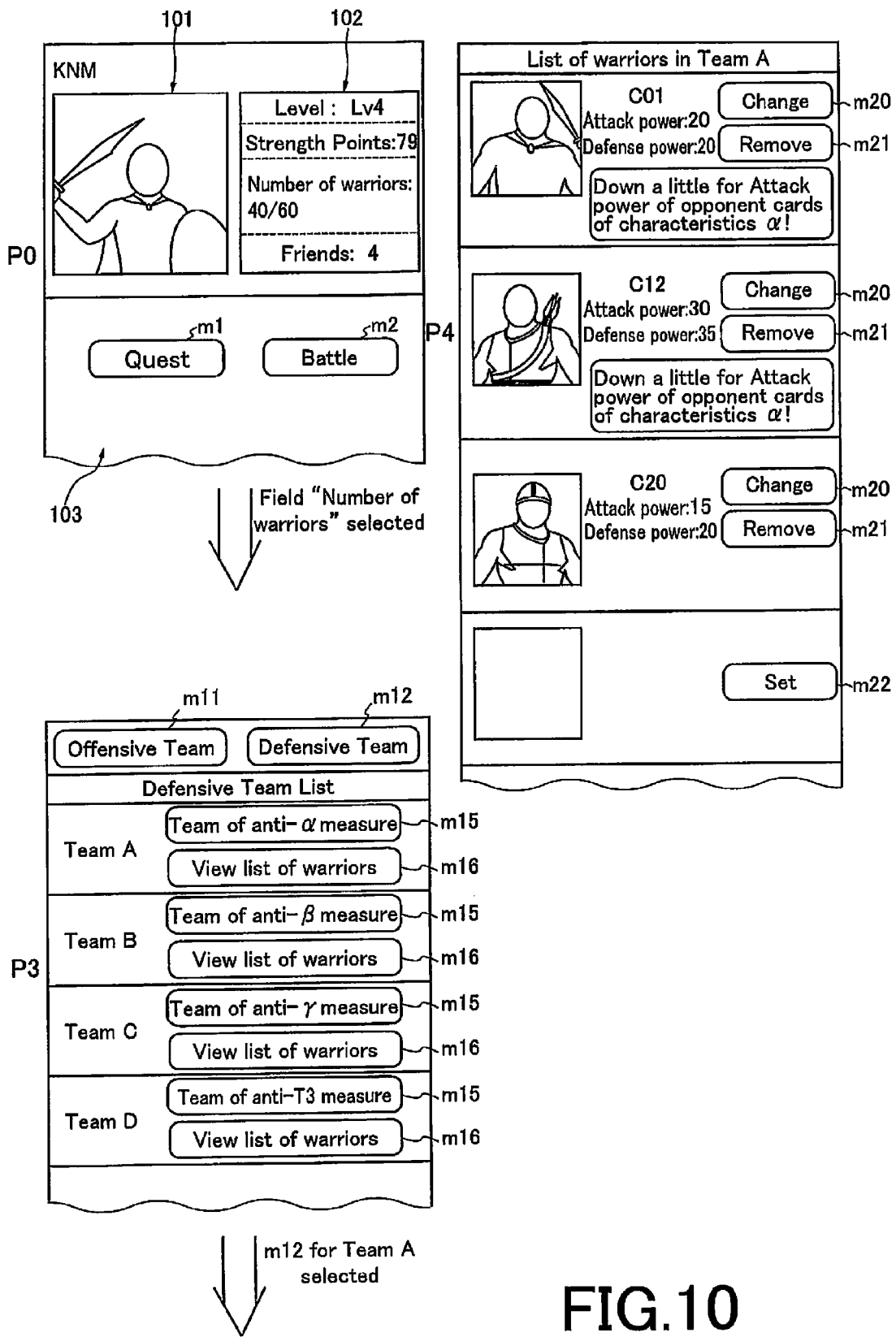
FIG. 10 illustrates an example of a series of web pages that are displayed on the communication terminal of a user.
Figure 11:
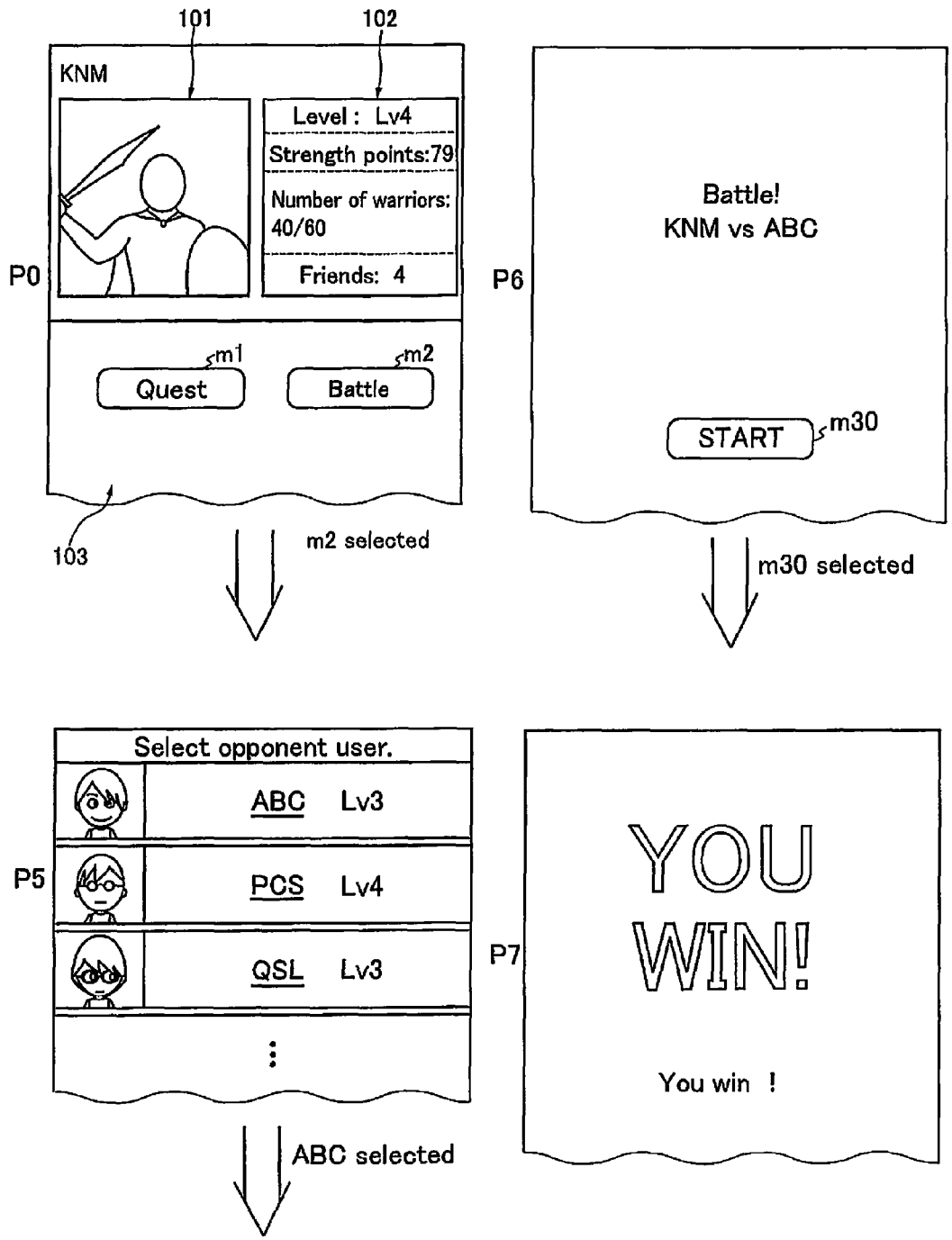
FIG. 11 illustrates an example of a series of web pages that are displayed on the communication terminal of a user.

The game of the present embodiment will be described hereinafter with reference to FIGS. 9 to 11. FIGS. 9 to 11 illustrate examples of web pages that are displayed on a communication terminal 10 when performing quest processing, team editing, and battle processing respectively.

In the following explanation, a user to be processed will be exemplified whose name is "KNM." This user will be referred to as "user KNM" hereinafter.

In the following explanation, buttons and marks and the like displayed on the web pages displayed on the communication terminal 10 are arranged in preferable positions on the web pages. The positions on the display screen, of the buttons and marks and the like made visible by the communication terminal 10, may be changed with a scrolling operation of the web page by the user using a direction instructional button or touch panel operation.

(5-1) Quest Processing (FIG. 9)

A web page P0 of FIG. 9 is an example of a top page of the game of the present embodiment. The top page is configured for respective game IDs. The exemplary top page in FIG. 9 includes a warrior image area 101, a user data area 102, and a menu area 103.

The warrior image area 101 is an area in which image of a warrior card is displayed. The warrior card to be displayed is specified by user KNM among a plurality of warrior cards that are included in the user data for user KNM to be processed.

The user data area 102 is an area in which respective fields of user data for user KNM to be processed is displayed. The displayed fields are: Progression level, Strength points, Number of warriors, and Friends. The "Number of warriors" is a total number of owned cards by the user. The "Friends" is a number of "User IDs of friends" in FIG. 6. As illustrated in FIG. 9, display of "40/60" in the field of "Number of warriors" indicates that a number of warrior cards that the user owns is forty while the greatest number of warrior cards that the user can own is sixty.

The menu area 103 is an area for displaying buttons m1 and m2 in which "Quest" and "Battle" are respectively displayed. The buttons m1 and m2 are basic buttons that respectively correspond to the quest processing and battle processing provided in the game of the present embodiment.

The updated web page P1 will be displayed in response to a selection operation to the button m1 on the web page P0. The web page P1 includes a button m10 for exploring an area while consuming a predetermined value of the strength points. Every time the button m10 is selected, an exploration rate increases by a fixed or a randomly determined value. If the exploration rate reaches 100%, exploration of the area terminates. A plurality of areas may be provided to be explored. If a user selects the button m10, the user is given a warrior with a fixed or a randomly determined probability as exemplified by the web page P2.

Note that, if the strength points are less than the above predetermined value, the quest processing cannot be performed and the user needs to wait until the strength points recover.

(5-2) Team Editing (FIG. 10)

If the field "Number of warriors" is selected on the web page P0 of FIG. 10, the updated web page P3 will be displayed. On the web page P3, team editing can be performed with regard to user KNM. The team editing is for setting and unsetting warrior cards for an offensive team and a defensive team in a battle. A button m11 ("Offensive team") and a button m12 ("Defensive team") are displayed in the web page P3. By selecting one of the buttons m11 and m12, the user can perform editing the offensive team or the defensive team. On the web page P3 of FIG. 10, the button m12 is selected and the defensive team is edited. In this example, a pull-down menu m15 and a button m16 ("View list of warriors") are positioned while being associated with each of defensive teams A to D as a list of defensive teams. The pull-down menu m15 is configured so that one of the following six options can be selected. Each of these six options corresponds to an effect activated with respect to an offense team of an opponent user. With these six options, a defensive team is selectable in a battle so that the activated effect is suppressed.

"Team of anti-α measure" is an option to be selected in the case in which: user characteristics of an opponent user (offensive user) in a battle is α, and a warrior card of card characteristics α is included in an offensive team.

"Team of anti-β measure" is an option to be selected in the case in which: user characteristics of an opponent user (offensive user) in a battle is β, and a warrior card of card characteristics β is included in an offensive team.

"Team of anti-γ measure" is an option to be selected in the case in which: user characteristics of an opponent user (offensive user) in a battle is γ, and a warrior card of card characteristics γ is included in an offensive team.

"Team of anti-T1 measure" is an option to be selected in the case in which three or more warrior cards of type T1 are included in an offensive team of an opponent user (offensive user) in a battle.

"Team of anti-T2 measure" is an option to be selected in the case in which three or more warrior cards of type T2 are included in an offensive team of an opponent user (offensive user) in a battle.

"Team of anti-T3 measure" is an option to be selected in the case in which three or more warrior cards of type T3 are included in an offensive team of an opponent user (offensive user) in a battle.

In an example of the web page P3, the user has selected "Team of anti-α measure", "Team of anti-β measure", "Team of anti-γ measure", and "Team of anti-T3 measure" with respect to the defensive teams A, B, C, and D respectively.

If a button m16 ("View list of warriors") is selected in the web page P3, the updated web page P4 will be displayed for example and the user can view a list of warrior cards (list of warriors) that is set as the defense team corresponding to the button m16 that has been selected. For example, the web page P4 is a list of warrior cards for the defense team A.

The web page P4 includes: the button m20 ("Change") for setting a warrior card with which a warrior card being currently set is replaced, and the button m21 ("Remove") for unsetting a warrior card that is currently set. Values of the parameters such as attack power and defense power and a content of a skill if any are displayed in text format on respective warrior cards.

In the game of the present embodiment, a number of warrior cards settable for the offensive team and the defensive team may be limited in a prescribed value. If the number of warrior cards that are set is less than the prescribed value, a button m22 ("Set") will be provided for adding a warrior that is to be newly set.

In this game, the team of anti-α measure has been selected as the defensive team A in the web page P3 for example. Hence, if a condition is satisfied that: user characteristics of the offensive user starting a battle is α; and a warrior card of card characteristics α is included in an offensive team, the defensive team A will be selected as a defensive team for the battle. Since the offensive team that satisfies the condition is supposed to increase attack power of warrior cards of card characteristics α, it is preferable that user KNM preset, in the defensive team A, warrior cards having a skill that reduces attack power of warrior cards of card characteristics α of the offensive user, such as warrior cards C1, C12 (see FIG. 8).

(5-3) Battle Processing (FIG. 11)

If the button m2 is selected in the web page P0 of FIG. 11, the updated web page P5 will be displayed. A list of the other users as opponent user candidates is displayed in the web page P5. If one user is selected as a defensive user from the list, the web page P6 will be updated. In this example, a battle between user KNM (offensive user) and user ABC (defensive user) is performed. If a button m30, in which "START" in text displayed, is selected, the updated web page P7 will be displayed. In the web page P7, an example is shown in which user KNM has won the battle.

(6) Overview of Functions of Game Control Device

Next, respective processing in the game control device to realize the game of the present embodiment will be described.

Figure 12:
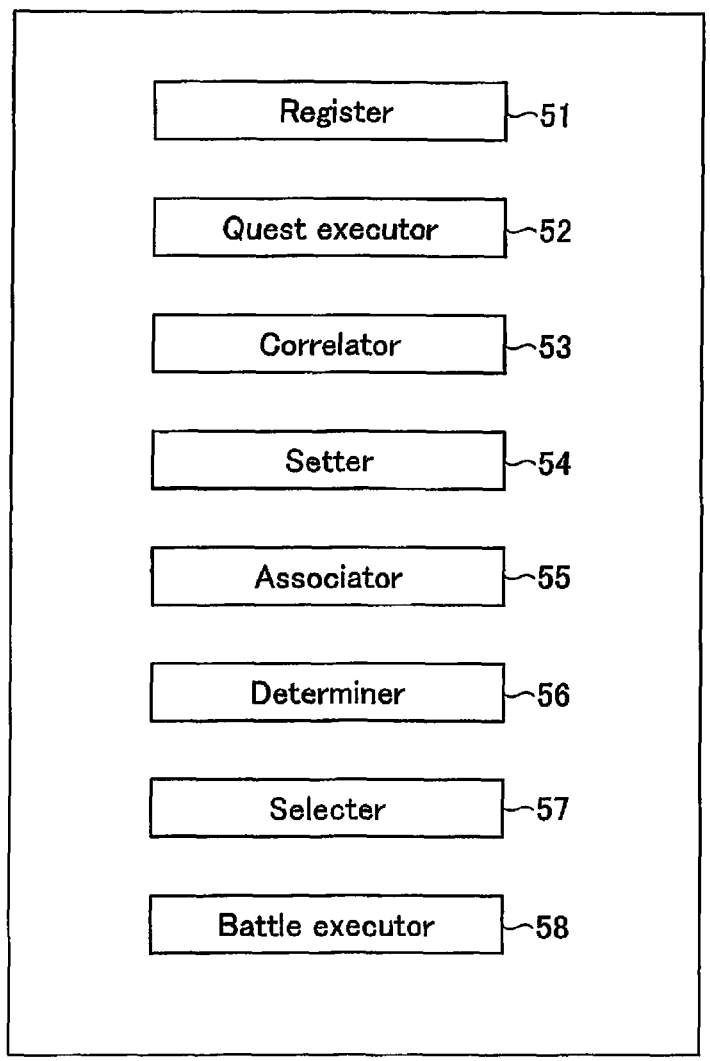
FIG. 12 is a functional block diagram for explaining functions that play main rolls in the game control device according to the embodiment.

In the present embodiment, the game control device is configured, for example, by the game server 20 and the database server 30. Hereinafter, functions performed by the game control device of the present embodiment will be described with reference to FIG. 12 in the case in which the above-described game of the present embodiment is applied. FIG. 12 is a functional block diagram for explaining functions playing main rolls in the game control device according to the present embodiment. In the functional block diagram illustrated in FIG. 12, the register 51 and the quest executor 52 are not mandatory elements in the present invention.

The register 51 includes a function for recognizing a registration request from a user and performing registration processing in response to an operational input to the communication terminal 10 on a web page for example that is provided to the communication terminal 10. The registration processing is performed when a user is registered in the game of the present embodiment.

The function of the register 51 may be realized, for example, as described below. The CPU 21 of the game server 20 receives a registration request message from the communication terminal 10 through the communication interface unit 25. The web page provided by the game server 20 may be configured so that a registration request message is automatically generated by a certain operation (e.g., a selection of a certain button, or input of text of user ID and password, etc.) to the communication terminal 10 on the web page. Information (e.g., identification information of the communication terminal 10 as a transmission source such as UID (Unique Identifier), a mail address, etc.) may be included in the registration request message. Alternatively, in the case in which the user plays the other game(s) from the same service provider, the registration request message may include the user ID of that user.

In the present embodiment, the registration request message includes a selection result of user characteristics ($\alpha$, $\beta$, or $\gamma$) based on a selection operation by a user. Selection of the user characteristics may be made in a pull-down method on a web page provided from the game server 20 during a period in which registration is performed.

If the CPU 21 receives the registration request message in which a user ID is not included, the CPU 21 issues a new user ID and processes the new user ID, and then transmits a message to the communication terminal 10 indicating the fact that the registration has been completed. If the CPU 21 receives the registration request message in which a user ID is included in the registration request message, the CPU 21 processes that user ID, and then transmits a registration completion message to the communication terminal 10.

When the registration is completed, the CPU 21 prepares user data corresponding to the user ID and stores the user data in the user database 31. Once the registration is completed, the user corresponding to the user ID can start playing the game of the present embodiment.

The register 51 also includes a function for associating a user with one or more users. For example, when receiving an application based on a user ID, the register 51 associates the user ID with the other user ID. That is, the register 51, in response to application based on a user ID, registers the other user ID (namely, the other user) as "friend."

The function of the associator 51 will be realized for example as described below. The CPU 21 of the game server 20 receives an application message (application) that specifies a user ID (or the corresponding user name) to desirably be friends with, from the communication terminal 10 of the user corresponding to a user ID through the communication interface unit 25. The transmission of the application message may be preset as a function of the web page provided to the communication terminal 10 of the user. Upon receiving the application message, the CPU 21 transmits HTML data to the communication terminal 10 corresponding to the user ID, when access occurs based on the user ID included in the application message. The transmitted HTML data is for displaying a web page to request for replying whether or not the application on the basis of the other user ID is approved. The CPU 21 registers both users as friends if a message of approval of the application is returned. Specifically, the CPU 21 writes the data in the "User IDs of friends" field (see FIG. 6) of the user data of the two corresponding user IDs in the user database 31.

A condition under which users are associated with each other is not limited to one that requires application and approval, which is described above. For example, users who have played a battle together may be registered as users who are associated each other in the game, namely friends. Alternatively, users who transmit greeting messages to each other at predetermined times may be automatically registered as friends. If a battle play is embedded in a game, users who play battles together at predetermined times may be automatically registered as friends.

Instead of directly associating a user with other user, each of a plurality of users may be associated with an identical group (guild, etc.) and resultantly a user in the group may be associated with any other user in the group. For example, if user A makes an application as described to user B who is associated with a specific group and receives approval from user B, then user A is made associated with the specific group. With an application and approval with respect to a user in a specific user, a user in a group may be associated with other user in the identical group irrespective of whether a direct application and approval have been made.

In the present embodiment, an example is disclosed in which registration of users as friends is realized by writing data into the user database 31; however, registration of users as friends is not limited to such example. Data with regard to friends may be written to an external memory device in the network accessible from the game server 20.

The quest executor 52 includes a function for performing quest processing by transmitting HTML data for sequentially updating a web page to be displayed on the communication terminal 10, in response to an operation by a user to the communication terminal 10. In order to realize the function of the quest executor 52, the CPU 21 of the game server 20: receives a HTTP request from the communication terminal 10 through the communication interface unit 25; performs processing steps that are requested based on the HTTP request; and sends the communication terminal 10 a HTTP response including HTML data which is a result of the processing steps.

The function of the quest executor 52 will be realized for example as described below.

First, in the case in which the top page (web page P0) of FIG. 9 is displayed on the communication terminal 10 of a user, the CPU 21 of the game server 20 accesses to the user database 31 through the database access unit 24, and reads data of respective fields in the user data area 102 and image data of a warrior card to be displayed in the warrior image area 101. The CPU 21 then generates HTML data such that a top page is configured as illustrated in FIG. 9, and transmits the HTML data to the communication terminal 10. The generated HTML data is different for each user (namely, for each user ID). The communication terminal 10 interprets the received HTML data, and displays an image of the top page on the display unit 16 (display screen 16a).

Next, if the CPU 21 receives a HTTP request including a selection result with regard to a button m1 ("Quest") in the web page P0, the CPU 21 will generate HTML data for a web page of the quest processing and transmit the HTML data to the communication terminal 10 of the user. Thereby, the web page P1 will be displayed on the communication terminal 10 of user KNM. If the CPU 21 recognizes a selection of the button m10 ("Explore") in the web page P1, the CPU 21 will increase the exploration rate (%) by a fixed or a randomly determined value. If the exploration rate reaches 100%, then an area to be explored by the user will be changed. Every time the button m10 is selected, the CPU 21 decreases the strength points by a certain value for example. Every time the button m10 is selected, the CPU 21 determines that it gives the user a warrior card with a fixed or a randomly determined probability. When it is determined that the CPU 21 gives the user a warrior card, the CPU 21 selects one warrior card from a plurality of warrior cards that are prepared in the game. After selecting the warrior card, the CPU 21 accesses to the card database to write data of the selected card in the field of "Owned card" for user KNM. Here, default data of card characteristics, warrior type, and parameters (attack power, defense poser) for the given warrior card is predetermined and written into the card database for user KNM.

The correlator 53 includes a function for correlating a plurality of warrior cards as objects with each of a plurality of users.

In order to realize the function of the correlator 53, as described above for example, the CPU 21 of the game server 20, when a warrior card is given in the quest processing, accesses to the card database and writes data of the given warrior card in the field of "Owned card" for a user to be processed. Thereby, the user is correlated with the given warrior card. A time when a warrior card is correlated as an owned card by the user is not limited to a time when the warrior card is given to the user in the quest processing. For example, in the case in which a card drawing function is provided for giving a warrior card randomly in exchange for a certain price in the game or a certain points in the game, a warrior card is correlated as an owned card by the user, when the user plays the card drawing and obtains the warrior card. Further, a warrior card is correlated as an owned card by the user, when the user receives the warrior card from his or her friend through a trade with the friend or as a present from the friend.

The setter 54 includes a function for setting a plurality of defensive teams (object groups) based on a plurality of warrior cards (objects) that are correlated with a user as owned cards. In the present embodiment, four defensive teams A to D are set.

The function of the quest executor 52 will be realized for example as described below. After recognizing that the button m16 ("View list of warriors") associated with each of the defensive teams A to D has been selected in the web page P3 of FIG. 10 for example, the CPU 21 of the game server 20: refers to the card database (see FIG. 7); reads warrior cards whose flag is "1" (set); generates a list of warriors; and transmits HTML data including the list of warriors, to the communication terminal 10.

After recognizing that the button m20 ("Change") has been selected in the web page P4, the CPU 21 refers to the card database, generates HTML data including a list of owned warrior cards by the user, and transmits the HTML data to the communication terminal 10. A web page (not shown) that is displayed based on this HTML data is configure so as to accept an operation for selecting a warrior card that is to be newly set instead of a warrior card that is currently set. If the CPU 21 receives a HTTP request including a selection result with regard to a warrior card to be newly set, the CPU 21 will access to the card database to change a flag for the defensive team A from "1" to "0" with respect to an owned card to be unset (that is, a warrior card corresponding to the button m20 that has been selected) and to change a flag for the defensive team A from "0" to "1" with respect to an owned card to be newly set for the defensive team A.

After recognizing that the button m21 ("Remove") has been selected in the web page P4, the CPU 21 accesses to the card database to change a flag for the defensive team A from "1" to "0" with respect to an owned card to be unset (that is, a warrior card corresponding to the button m21 that has been selected) for the defensive team A.

After recognizing that the button m22 ("Set") has been selected in the web page P4, the CPU 21: refers to the card database; generates HTML data including a list of owned cards by the user; and transmits the HTML data to the communication terminal 10. A web page (not shown) that is displayed based on this HTML data is configured so as to accept an operation for selecting a warrior card that is to be newly set. If the CPU 21 receives a HTTP request that includes a selection result with regard to a warrior card to be newly set, the CPU 21 will access to the card database to change a flag for the defensive team A from "0" to "1" with respect to an owned card to be newly set for the defensive team A (that is, a warrior card corresponding to the button m22 that has been selected) for the defensive team A.

As exemplified above, each of warrior cards is set for a specific defensive team from four defensive teams that have been predefined. Alternatively, a plurality of defensive teams (object groups) that a user desires are formed based on a selection operation by the user. The selection operation may be one for setting a warrior card for a specific defensive team, or one for unsetting a warrior card for a specific defensive team. Note that, same as the defensive team, a warrior card can be set or unset for an offensive team based on a selection operation by a user.

The associator 55 includes a function for associating each of the plurality of defensive teams (object groups) that have been set by the setter 54, with a team type. The team type is determined as a type of an offensive team (object group) of an offensive user.

With the function of the associator 55, a user can allocate each of a plurality of defensive teams adapted for a team type of an offensive team. Hence, a defensive user who is supposed to fight back asynchronously can effectively fight back against the offensive team of a variety of team types.

FIG. 13 illustrates a skill activation table for offensive teams. In the skill activation table, a condition of effect activation is associated with an activated skill, with respect to team types V1 to V6 as examples of team types of offensive teams (object groups) of opponent users. For example, in the case of the team type V1, if a condition (condition of effect activation) is satisfied under which: an opponent user characteristics is α; and an offensive team includes a warrior card of card characteristics α, attack power in warrior cards of card characteristics α increases by a randomly determined value in a range of 10 to 20%. In the case of the team type V4, if a condition (condition of effect activation) is satisfied under which an offensive team of an opponent user includes three or more warrior cards of warrior type T1, attack power in warrior cards of warrior type T1 increases by a randomly determined value in a range of 5 to 15%.

In the case of the skill activation table of FIG. 13, the associator 55 associates each of the defensive team A to D with a team type based on input information by a user for example, as illustrated in FIG. 14. FIG. 14 illustrates a team association table for defensive teams. In the team association table, each of the defensive teams A to D is associated with one of team types for an offensive team. In this example, the defensive team A of user ID: 000001 (user KNM) is associated with team type V1, assuming that a team type of an offensive team of an opponent user is V1.

The function of the associator 55 will be realized for example as described below. Each of the options provided in the pull-down menu m15 in the web page P3 of FIG. 10 for example is associated with each of the defensive teams. Each of the options is recorded in the ROM 22, etc. of the game server 20, in association with a team type as described below. If the CPU 21 recognizes an option selected from the pull-down menu m15 by a user, the CPU 21 writes, in the team association table, a team type that is associated with the selected option. Note that the team association table may be stored in the game database 32.

[Example for Associating Each of the Options of the Pull-down Menu m15 with a Team Type]

Anti-α measure team: V1
Anti-β measure team: V2
Anti-γ measure team: V3
Anti-T1 measure team: V4
Anti-T2 measure team: V5
Anti-T3 measure team: V6

As described above, it is preferable that the associator 55 associates each of the defensive teams with one of a plurality of team types for an offensive team, based on an option selected from the pull-down menu m15 (input information by an user). This motivates the user to properly set a defensive team for a team type of the offensive team, by selecting warrior cards applied for the defensive team, etc.

The determiner 56 includes a function for determining a team type (namely, group type) of an offensive team (namely, object group) of an opponent user before a battle of the present embodiment is executed. Because the battle of the present embodiment is performed asynchronously, the determiner 56 and the selector 57, which will be described later, are provided such that a defensive user can effectively fight back in a battle started by other user.

Figure 15:
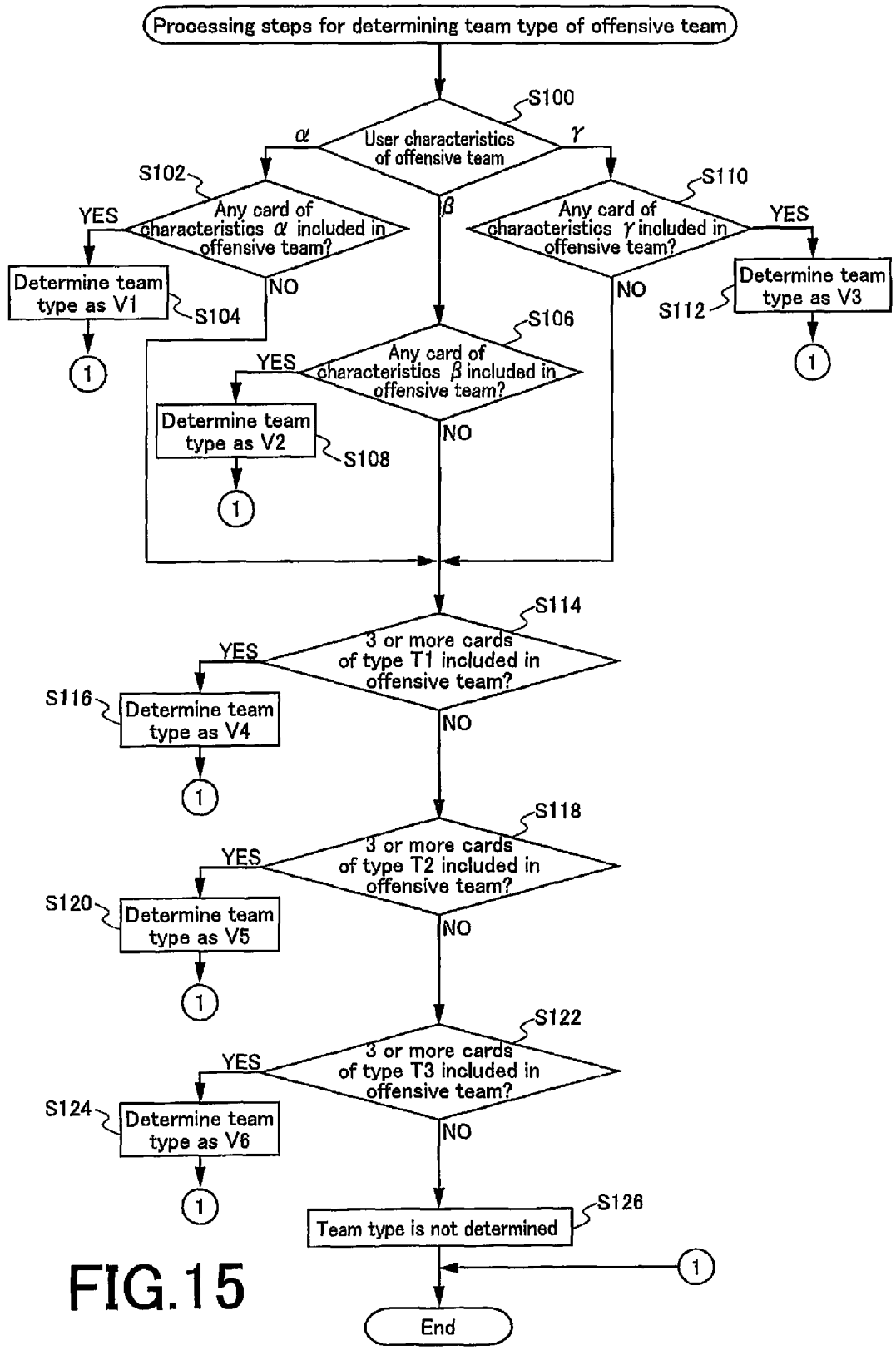
FIG. 15 is a flowchart of processing steps for determining a team type of an offensive team.

Referring now to FIG. 15, the function of the determiner 56 will be realized for example as described below. FIG. 15 illustrates processing steps for determining a team type of an offensive team. This processing steps are performed by the CPU 21 of the game server 20.

First, the CPU 21 refers to the user database and determines user characteristics of an offensive user who has started a battle (Step S100). If it is determined at Step S100 that the user characteristics of the offensive user is α, the CPU 21 then refers to the card database to determine whether the defensive team of the defensive user includes any card of characteristics α (that is, any warrior card whose card characteristics is α) (Step S102). If it is determined that the defensive team includes a card of characteristics α (Step S102: YES), the CPU 21 determines the team type of the offensive team of the offensive user as V1 (Step S104) and terminates the processing steps. If it is determined at Step S102 that the defensive team does not include any card of characteristics α (Step S102: NO), the CPU 21 proceeds to Step S114.

If it is determined at Step S100 that the user characteristics of the offensive user is β, the CPU 21 then refers to the card database to determine whether the defensive team of the defensive user includes any card of characteristics β (that is, any warrior card whose card characteristics is β) (Step S106). If it is determined that the defensive team includes a card of characteristics β (Step S106: YES), the CPU 21 determines the team type of the offensive team of the offensive user as V2 (Step S108) and terminates executing the processing steps. If it is determined at Step S106 that the defensive team does not include any card of characteristics β (Step S106: NO), the CPU 21 proceeds to Step S114.

If it is determined at Step S100 that the user characteristics of the offensive user is γ, the CPU 21 then refers to the card database to determine whether the defensive team of the defensive user includes any card of characteristics γ (that is, any warrior card whose card characteristics is γ) (Step S110). If it is determined that the defensive team includes a card of characteristics γ (Step S110: YES), the CPU 21 determines the team type of the offensive team of the offensive user as V3 (Step S112) and terminates executing the processing steps. If it is determined at Step S110 that the defensive team does not include any card of characteristics γ (Step S110: NO), the CPU 21 proceeds to Step S114.

In Step S114, the CPU 21 refers to the card database to determine whether the defensive team of the defensive user includes three or more warrior cards of warrior type T1. If it is determined that the defensive team includes three or more warrior cards of warrior type T1 (Step S114: YES), the CPU 21 determines the team type of the offensive team of the offensive user as V4 (Step S116) and terminates executing the processing steps. If it is determined that the defensive team does not include three of more warrior cards of warrior type T1 (Step S114: NO), the CPU 21 proceeds to Step S118.

In Step S118, the CPU 21 refers to the card database to determine whether the defensive team of the defensive user includes three or more warrior cards of warrior type T2. If it is determined that the defensive team includes three or more warrior cards of warrior type T2 (Step S118: YES), the CPU 21 determines the team type of the offensive team of the offensive user as V5 (Step S120) and terminates executing the processing steps. If it is determined that the defensive team does not include three of more warrior cards of warrior type T2 (Step S118: NO), the CPU 21 proceeds to Step S122.

In Step S122, the CPU 21 refers to the card database to determine whether the defensive team of the defensive user includes three or more warrior cards of warrior type T3. If it is determined that the defensive team includes three or more cards of warrior type T3 (Step S122: YES), the CPU 21 determines the team type of the offensive team of the offensive user as V6 (Step S124) and terminates executing the processing steps. If it is determined that the defensive team does not include three of more cards of warrior type T3 (Step S122: NO), the CPU 21 proceeds to Step S126.

After proceeding to Step S126, the CPU 21 terminates executing the processing steps without determining a team type of the defensive team of the defensive user.

As described above, the determiner 56 may determine a team type of the offensive team, based on one of: user characteristics (an example of registration information) of the opponent user; a warrior card (an example of an object) set for the offensive team; and a combination of warrior cards set for the offensive team. With this determination method applied, it becomes possible to determine a team type of a team of the opponent user based on an element that could influence on capability of the offensive team in a battle.

The selector 57 includes a function for selecting a defensive team (object group) of a user from a plurality of defensive teams that have been set. The selected defensive team is one associated with a team type of an offensive team that is determined by the determiner 56.

In order to realize the function of the selector 57, the CPU 21 of the game server 20 refers to the team association table (see FIG. 14) to determine a defensive team (one of the defensive teams A to D) that is associated with a team type that has been determined according to the flowchart of FIG. 15 with regard to the offensive team of the offensive user.

Note that, if any team type has not been determined in the flowchart of FIG. 15, the CPU 21 may automatically set a defensive team, for the battle processing, based on: priority for respective warrior cards that has been preset by a user; and defense power or cost of the respective warrior cards. Here, the cost is a value that is associated with a warrior card. Total cost of warrior cards that are set for a defensive team may be limited to a prescribed value.

The battle executor 58 includes a function for performing battle processing with regard to a battle between an offensive team and a defensive team. Each of the offensive team and the defensive team is comprised of warrior cards (namely, objects).

As described above, in the game of the present embodiment, the battle processing between two users starts with a selection operation for the button m2 ("Battle") on the top page by a user who is logged into the game. That user is an offensive user who selects other user as an opponent user and attacks the opponent user using an offensive team. The other user as an opponent user is a defensive user who defenses using a defensive team. The opponent user cannot perform any operations for execution of the battle irrespective of whether the opponent user is logged into the game. The opponent user is supposed to recognize the battle result when the opponent user accesses to the game after the battle finishes. That is, the only offensive user can perform operations that can be influential to the battle result. In other words, battle processing between two users are performed asynchronously. Note that a number of warrior cards settable for each of the offensive team and the defensive team may be limited to a prescribed value for example.

A result of a battle between an offensive team and a defensive team will be determined with the following method. That is, a total value of attack power of all warrior cards that are set for the offensive team (which will be referred to as "total attack power") is compared with a total value of defense power of all warrior cards that are set for the defensive team (which will be referred to as "total defense power"). If the total attack power is equal to or greater than the total defense power, it is determined that the offensive team wins. If the total attack power is less than the total defense power, it is determined that the defensive team wins. Here, attack power and defense power of respective warrior cards in the battle may be varied depending on an effect activated for the offensive team (see FIG. 13) and a skill activated for the defensive team (see FIG. 8). The total attack power and the total defense power are calculated based on varied values of respective warrior cards.

In the case in which the method for determining a result of a battle between an offensive team and a defensive team as described above is applied, the function of the battle executor 58 will be realized for example as described below. Once an offensive user and a defensive user are determined for a battle, the CPU 21 of the game server 20 refers to the card database to read: warrior cards set for the offensive team of the offensive user (that is, warrior cards whose flags are set to "1") and attack power of the warrior cards; and warrior cards set for the defensive team of the defensive user (that is, warrior cards whose flags are set to "1") and defense power of the warrior cards. Here, the CPU 21 reads a defensive team that is selected from defensive teams A to D based on the team association table.

The CPU 21 loads data of warrior cards, attack power and defense power of each of the warrior cards that have been read, and perform the following processing steps. The CPU 21 refers to the skill activation table (see FIG. 13) for the offensive team. The CPU 21 determines whether any condition of effect activation is satisfied with respect to respective warrior cards in the offensive team that have been read. If there is a condition that is satisfied, the CPU 21 varies (increases) attack power of warrior cards based on an effect activated corresponding to the condition. Note that the effect may be activated with a fixed or a randomly determined probability. The CPU 21 refers to the skill activation table (see FIG. 8) for the defensive team. If there is a skill that is activated with respect to respective warrior cards in the defensive team that have been read, the CPU 21 varies (decrease), based on the skill, attack power of warrior cards in the offensive team. Note that the skill may be also activated with a fixed or a randomly determined probability.

The CPU 21 calculates total attack power of the offensive team and total defense power of the defensive team based on varied attack power and varied defense power of the respective warrior cards, and compares the total attack power and the total defense power. Then, if the total attack power is equal to or greater than the total defense power, it is determined that the offensive team wins. If the total attack power is less than the total defense power, it is determined that the defensive team wins.

When generating a list of other users as opponent user candidates (see the web page P5 of FIG. 11), it is preferable to select users whose progression level is equal to or close to a user to be processed (user KNM in FIG. 11). Further, a case has been discussed with reference to the web page P5 of FIG. 11 in which the user selects an opponent user; however, the present embodiment is not limited to this specific example. The opponent user may be automatically selected by the CPU 21.

(7) Flow of Battle Processing According to the Present Embodiment

Figure 16:
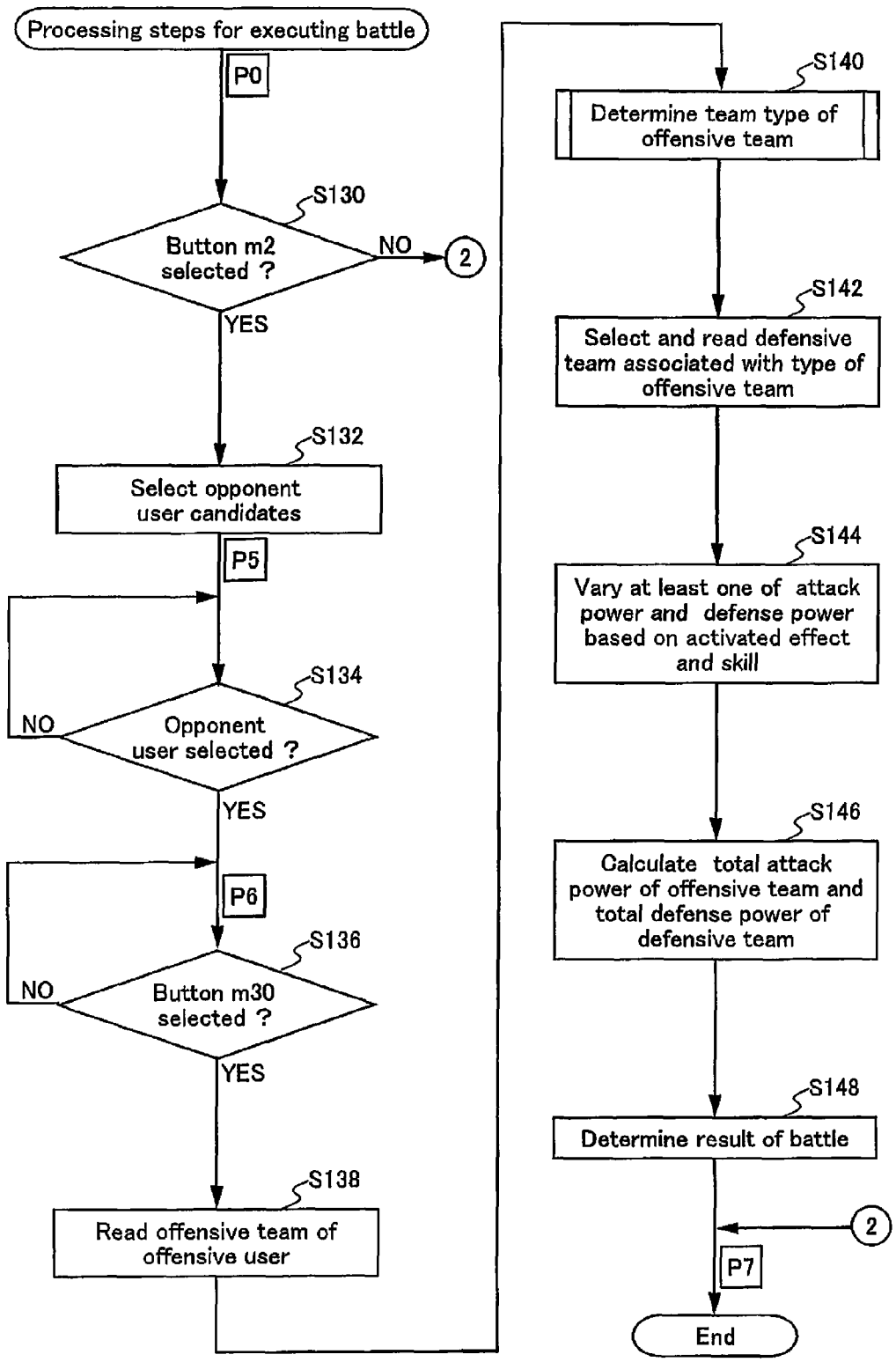
FIG. 16 is a flowchart of processing steps for executing a battle.

Next, a flow of battle processing according to the present embodiment will be described with reference to a flowchart of FIG. 16. FIG. 16 is a flowchart illustrating the battle processing according to the present embodiment. HTML data is sequentially transmitted for displaying respective web pages illustrated in FIG. 11 from the game server 20 to the communication terminal 10 in accordance with respective processing steps in the flowchart of FIG. 16; however, transmission of the HTML data is omitted in the flowchart and signs (P0, P5 to P7) of the web pages illustrated in FIG. 11 are described instead.

It is assumed in the flowchart of FIG. 16 that a user to be processed is user KNM, and that user KNM starts a battle against other user (that is, the offensive user is user KNM).

If the CPU 21 of the game server 20 recognizes that the button m2 ("Battle") is selected in a top page (the web page P0 of FIG. 11) (Step S130: YES), the CPU 21 selects a predetermined number of opponent user candidates for the user to be processed (Step S132). The CPU 21 then generates HTML data and transmits the HTML data to the communication terminal 10. The generated HTML is for displaying a web page (the web page P5 in FIG. 11) that includes a display image, a user name, and a progression level for each of the opponent user candidates. If the CPU 21 does not recognize that the button m2 has been selected (Step S130: NO), the CPU 21 terminates the battle processing. If the CPU 21 recognizes that one of the opponent user candidates has been selected as an opponent user (Step S134: YES), the CPU 21 generates HTML data and transmits the HTML data to the communication terminal 10. The generated HTML is for displaying a web page (the web page P6 in FIG. 11) that prompts the user to start the battle against the selected opponent user (that is, a defensive user). If the CPU 21 recognizes that the button m30 has been selected in the web page P6 (Step S136: YES), the CPU 21 performs the processing steps from Step S138.

The CPU 21 accesses to the card database to read an offensive team of user KNM as the offensive user (Step S138). That is, the CPU 21 reads all warrior cards set for the offensive team of user KNM and attack power of the warrior cards to load into the RAM. The CPU 21 then determines a team type of the offensive team that has been read, according to the flowchart illustrated in FIG. 15 (Step S140). In the example of the present embodiment, a team type is determined from the team types V1 to V6.

Next, the CPU 21 refers to the team association table (see FIG. 14) to select warrior cards set for a defensive team (one of defensive teams A to D) of the defensive user (user ABC in an example of FIG. 11) that is associated with the team type of the offensive team that has been determined at Step S140. The CPU 21 then accesses to the card database to read the defensive team that has been selected (Step S142). That is, the CPU 21 reads all warrior cards set for the defensive team and defense power of the warrior cards to load into the RAM. Because the defensive team associated with the team type of the offensive team is selected, it becomes possible to suppress activation of an effect that is advantageous to the offensive team.

After reading the offensive team and the defensive team, the CPU 21 varies at least one of attack power and defense power of the warrior cards based on effect(s) and/or skill(s) that are activated (Step S144). More specifically, the CPU 21 refers to the skill activation table (see FIG. 13) for the offensive team. The CPU 21 then determines whether any condition of effect activation has been satisfied with respect to respective warrior cards in the offensive team that have been read. If there is a condition that has been satisfied, the CPU 21 varies attack power of warrior cards based on an effect activated corresponding to the condition. Note that the effect may be activated with a fixed or a randomly determined probability. The CPU 21 refers to the skill activation table (see FIG. 8) for the defensive team. If there is a skill that is activated with respect to respective warrior cards in the defensive team that have been read, the CPU 21 varies, based on the skill, attack power of warrior cards in the offensive team. Note that the skill may be also activated with a fixed or a randomly determined probability.

The CPU 21 calculates total attack power of the offensive team and total defense power of the defensive team, based on the attack power and the defense power of the respective warrior cards that have been varied at Step S144 (Step S146). The CPU 21 compares the total attack power and the total defense power. Then, if the total attack power is equal to or greater than the total defense power, it is determined that the offensive team wins. If the total attack power is less than the total defense power, it is determined that the defensive team wins (Step S148). After determining a result of the battle, the CPU 21 transmits HTML data to the communication terminal 10 of user KNM. The HTML data is for displaying a web page (the web page P7 in FIG. 11) that includes the result of the battle.

If user ABC, who is the defensive user, is logged into or accesses to the game after the result of the battle is determined at Step S148, the CPU 21 transmits HTML data including the result of the battle to the communication terminal 10 of user ABC.

The battle of the present embodiment is performed asynchronously between a user who is logged into the game (namely, an offensive user) and other user (namely, a defensive user). During a period of time in which the battle is played, the defensive user cannot perform any operational input that can be influential to capability of a defensive team. However, assuming a variety of team types of an offensive team (that is, an element of an offensive team that can be influential to a battle), the defensive user can preset a plurality of defensive teams so that a defensive team effective to a type of the offensive team is selected from the plurality of defensive teams.

For example, assuming a case in which a user becomes a defensive user in a battle started by other user, the user presets a defensive team A so as to include a warrior card having a skill that reduces attack power of warrior cards of card characteristics α in an offensive team (such as warrior cards C1, C12; see FIG. 8). In the case in which a battle is started by other user after the defensive user A is preset, the defensive team A is selected if a team type of the offensive team of the offensive user who has started the battle is determined as V1. Here, attack power of the warrior cards of card characteristics α increases in the offensive team whose team type is V1; however, the defensive team A includes a warrior card having a skill that reduces the attack power of the warrior cards of card characteristics α in the offensive team, thereby suppressing effect activation in the offensive team.

As described above, according to the game control device in the present embodiment, assuming a plurality of offensive patterns by an offensive user who is logged into the game, a user can preset a plurality of defensive methods so that a defensive method is applied, from the plurality of defensive methods, in accordance with an offensive pattern. Therefore, imbalance between two users in a battle is reduced.

(8) Modifications

In the present embodiment described above, a warrior card has been applied as an example of an object; however, the object is not limited to the warrior card. For example, a character or an item, etc. may be applied as an object. A virtual person, a living thing, a monster, etc. or a card displaying those as described in the present embodiment, may be applied as an object.

In the present embodiment described above, a content of effects activated for an offensive team, and a content of skills of warrior cards set for a defensive team is not limited to those illustrated in FIG. 13 and FIG. 8 respectively. For example, in FIG. 13, effects activated for an offensive team are ones that increase attack power of warrior cards set for the offensive team. In contrast, effects that decrease defense power of a defensive team may be applied. Meanwhile, in FIG. 8, skills of a warrior card set for a defensive team are ones that decrease attack power of warrior cards set for the offensive team. In contrast, skills that increase defense power of a defensive team may be applied.

In the present embodiment described above, processing steps by the determiner 56 for determining a team type of an offensive team are not limited to those illustrated in FIG. 15. The processing steps by the determiner 56 are performed to select a defensive team that is properly adapted for an effect activated for an offensive team in a battle. In light of this, it is sufficient to assume that conditions of effect activation for the offensive team are in accord with conditions for determining a type of the offensive team. The conditions for determining a type may be modified in accordance with a variety of condition of effect activation for the offensive team.

For example, a condition that an offensive team includes a predetermined (three, for example) or more warrior cards of the same type is set as a condition of effect activation for the offensive team in FIG. 13. Alternatively, a condition may be applied that an offensive team includes a predetermined rate or more of warrior cards of the same type in the offensive team. In this case, condition for determining one of team types V4 to V6 (Step S114, S118, S122) may be respectively "A predetermined rate or more cards of types T1 (or T2, T3) includes in offensive team?"

In the present embodiment described above, if a user who is logged into the game performs an operation for starting a battle, the user becomes an offensive user using an offensive team and other user who is selected as an opponent user becomes a defensive user using a defensive team; however, the offensive user and the defensive user may be opposite. That is, if a user who is logged into the game performs an operation for starting a battle, the user may become a defensive user using a defensive team for defensing from attack of an offensive team of other user who is selected. In this case, the user presets a plurality of offensive teams, each of which is associated with a team type of a defensive team, so that a proper offensive team is selected from the plurality of offensive teams in the battle. Assuming a plurality of defensive patterns by a defensive user who is logged into the game, a user can preset a plurality of offensive methods so that an offensive method is applied, from the plurality of offensive methods, in accordance with a defensive pattern. Therefore, imbalance between two users in a battle is reduced.

Further modifications of the embodiment will be described below.

(8-1) Modification 1

In the present embodiment described above, the setter 54 may vary a number of defensive teams (namely, object groups), each possible to be set, depending on a progression status of the user.

"Progression status of the user" indicates a status regarding progression by the user in the game, such as progression speed in a game or in a stage of the game, in addition to a progression level of in the quest or the battle in the game of the present embodiment.

In the case in which a number of settable defensive teams increases as a progression level in a game becomes high, a user is motivated to make the progression level high in the game such that execution of a battle is favorable to the user. Further, in the case in which a number of settable defensive teams increases as progression speed in a game becomes faster, a user is motivated to advance the game continuously such that execution of a battle is favorable to the user. That is, in the case in which the game is not progressed after the degree of progression becomes high, a number of settable defensive teams decreases. Therefore, a user is motivated to advance the game continuously such that a number of settable defensive teams does not decrease.

In order to realize the function of the setter 54 in the present modification, a range (3 to 10, for example) of a number of settable defensive teams is defined. The maximum number of the defensive team in the range is recorded in the card database for respective user IDs. In the case of a progression level of a defensive user applied as a progression status in the game, the CPU 21 refers to user data to read the progression level of the defensive user. In the case of progression speed of a defensive user applied as a progression status in the game, the CPU 21 refers to user data at set time intervals (every one week, for example) to read the progression level of the defensive user, and finds progression speed (progression level per week, for example) by calculating a difference in the progression level during the certain period of time. Association table for associating progression level or progression speed with a number of settable defensive teams, is provided in the ROM 22, etc. The CPU 21 refers to the association table in the ROM 22 to calculate a number of settable defensive teams for respective users. Alternatively, the CPU 21 may apply the progression level or the progression speed to a given equation to find a number of settable defensive teams for respective users. If the CPU 21 finds a number of settable defensive teams for respective users, the respective user can set the found number of settable defensive teams. Adapted for variation in a number of the defensive teams, the CPU 21 varies: a number of options selectable in the pull-down menu m15 in the web page P3 of FIG. 10 for example; and a number of defensive teams, each possible to be associated in the team association table (that is, a number of defensive teams, each possible to be associated with a team type of offensive teams).

(8-2) Modification 2

In the present embodiment described above, the battle processing is performed irrespective of whether a defensive user is logged into the game. Then, the determiner 56 may determine a team type of an offensive team (that is, a team of an opponent user) while the defensive user is logged into the game. Note that the determiner 56 may determine a team type of the offensive team if a friend of the defensive user is logged into the game, even in the case in which the defensive user does not log into the game while the battle processing is performed.

If the current time is within a period of time after the login time of the user, it may be determined that the user is still logged into the game. If the current time is within a period of time after the latest access time of the user, it may be determined that the user is still logged into the game.

As described in the present embodiment, in the case in which the battle processing is executed irrespective of whether a defensive user is logged into the game, it is presumed that the defensive user is frustrated with a situation under which the defensive user cannot operate with regard to the battle game against an offensive user (namely, an opponent user) who starts a battle, even when the defensive user is logged into the game. Under such situation particularly, the battle game is executed based on a proper defensive team (namely, object group) from the plurality of defensive teams that have been set. Thereby, frustration of the defensive user can be appeased.

Further, a team type of the offensive team may be also determined when a friend of the defensive user is logged into the game. Because a proper defensive team is selected when the friend is logged into the game, communication of friends becomes activated.

In order to realize the present modification, the CPU 21 of the game server 20 records log data of login time and access time of a user in user data of the user for example. Before starting battle processing, the CPU 21 determines whether a defensive user is logged into the game. That is, the CPU 21 determines whether the current time is within a period of time after the login time of the defensive user, or whether the current time is within a period of time after the latest access time of the defensive user. If the CPU 21 determines that a defensive user is logged into the game, the CPU 21 determines a team type of an offensive team of an offensive user in the battle processing and selects a defensive team in accordance with the determination result. If the CPU 21 determines that a defensive user is not logged into the game, the CPU 21 may apply a fixed defensive team to the battle processing from a plurality of defensive teams, or may automatically apply a defensive team based on priority of respective warrior cards preset by the user, and defense power and cost of the respective warrior cards. Here, the cost is a value that is associated with a warrior card. Total cost of warrior cards set for the defensive team may be limited to a prescribed value.

Note that, in order to determine whether friend(s) of the defensive user is logged into the game, the CPU 21 refers to user data of the defensive user to identify the friend(s) of the defensive user, and determines whether the friends(s) are logged into the game based on login time or access time.

(8-3) Modification 3

In the present embodiment described above, the associator 55 may vary a number of the team types, each possible to be associated with a user, depending on a progression status of the user. For example, in the case in which thirty team types of an offensive team are provided, that is, thirty conditions of effect activation are provided, a number of the team types, each possible to be associated, may be gradually increased from a default value (five, for example) to 10, 15, . . . , as a progression level increases. This allows the user, as the user progresses the game, to deal with as many offensive teams (object groups) of an offensive user (namely, opponent user) as possible, which places the user in a favorable position. Thereby, the user is motivated to progress the game. Same as the modification 1, the number of the team types, each possible to be associated, may be increased as progression of the game is faster. In this case, the user is motivated to advance the game continuously so that execution of the battle game is favorable to the user.

In order to realize the associator 55 in the present modification, defensive teams, number of which is the same as that of the offensive teams are recorded in the card database. The CPU 21 of the game server 20 allows a user to set a number of defensive teams. The number of the defensive teams that the user can set is associated with a progression level of the user. Adapted for increase in a number of the defensive teams, the CPU 21 varies: a number of options selectable in the pull-down menu m15 in the web page P3 of FIG. 10 for example; and a number of defensive teams, each possible to be associated in the team association table (that is, a number of defensive teams, each possible to be associated with a team type of offensive teams).

The exemplary embodiment of the present invention has been explained in detail. However, the present invention is not limited to the aforementioned exemplary embodiment. Further, it is apparent that a variety of changes and modifications can be made for the exemplary embodiment without departing from the scope of the present invention. For example, technical matters that are described in the embodiment and the Modifications may be combined.

In the embodiment described above, an operational input is an input of pressing an operational button on the communication terminal of a user, or an input of a touch operation to a display screen of the communication terminal that includes a touch panel function; however, an operational input is not limited to these examples. The operational input may be an operational input by swinging the communication terminal having an acceleration sensor, or may be an operational input by a gesture (gesture input). If a gesture is performed to a communication terminal having an imaging function, the communication terminal captures an image of the gesture and recognizes an operational input that corresponds to the gesture. Further, in the case of a communication terminal in which voice recognition program is executable, an operational input may be a voice input.

Figure 17A:
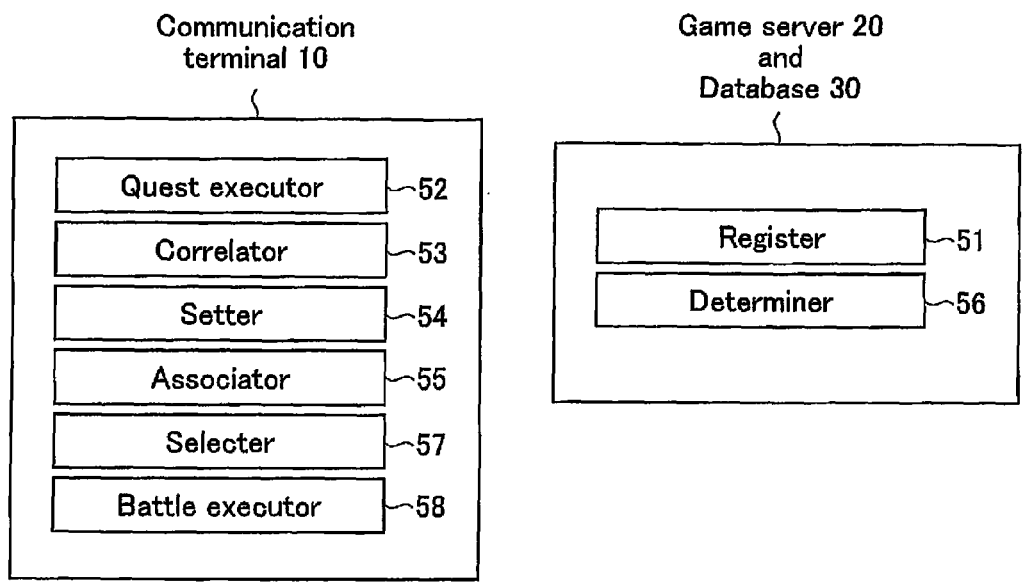
FIG. 17A illustrates an example in which the functions are distributed to the communication terminal, and the game server and the database server, with regard to the game control device according to the embodiment.
Figure 17B:
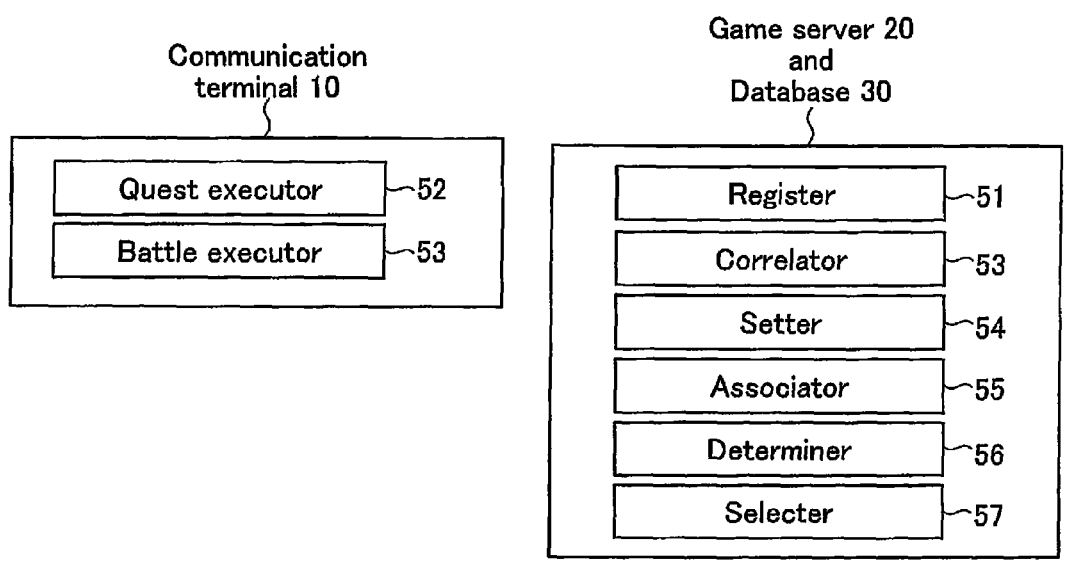
FIG. 17B illustrates an example in which the functions are distributed to the communication terminal, and the game server and the database server, with regard to the game control device according to the embodiment.

In the embodiments described above, the functions included in respective means illustrated in FIG. 12 are configured to be realized by the game server 20 and the database server 30 on a network; however, the present invention is not limited to such configuration. At least one of the means in FIG. 12 may be configured to be realized by the communication terminal 10. Because the communication terminal 10 and the game server 20 may involve the substantially same hardware configuration, the functions can be also realized by the communication terminal 10 as described in the above embodiments. Although the card database in recorded in the game database 32 in the embodiment described above, the card database may be temporarily recorded in a HDD (Hard Disk Drive; not shown) or a flash memory of the communication terminal 10 alternatively. FIGS. 17A and 17B each illustrates an example of configuration in which the functions (ones illustrated in FIG. 12) of the game control device of the present embodiment are shared between the communication terminal 10, and the game server 20 and the database server 30.

<Appendix>

Aspects of the present invention are disclosed hereinafter.

A first aspect of the present invention is a game control device including:

a correlator configured to correlate a plurality of objects with each of a plurality of users including a first user and a second user;

a setter configured to set a plurality of object groups including more than one object selected from the plurality of objects correlated with each of the plurality of users for each of the plurality of users;

an associator configured to associate each of the plurality of object groups set by the setter, with a group type;

an executor configured to execute a battle game between an object group of the first user and an object group of the second user;

a determiner configured to determine a group type of the object group of the second user before the battle game is executed; and a selector configured to select an object group of the first user from the plurality of object groups set for the first user, the object group of the first user applied to the battle game, the object group of the first user associated with the group type that is determined by the determiner.

An "object" in this game control device may be a character or an item in the game, for example. A character may be, for example, a virtual person, a virtual creature, or a monster. A card on which a virtual person, a virtual creature, or a monster is displayed, may be also an object.

A "group type" in this game control device is information that identifies an element of an object group that can be influential differently to capability in the battle game of groups. An example of the element of the group is: registration information of a user for which the object group is set, an object or a combination of objects included in the object group, or an effect that is activated by the object group in the battle game, etc.

Assuming a variety of group types of an object group of the second user (namely an opponent user), the first user can preset the user's plurality of object groups before the battle game is executed, so that an object group effective to the object group of the second user is selected from the first user's plurality of object groups. In executing the battle game, a group type of an object group of the second user is determined. An object group associated with the determined group type of the object group of the second user is selected from the plurality of groups that have been set. The selected object group is applied for the battle game against the object group of the second user. Thereby, even in the case in which the first user does not perform any input in the battle game, the battle game is executed based on a proper group that has been set from the plurality of groups.

In the case in which a battle game is performed asynchronously between users such as a social network game, the battle game starts when an input from the second user, who is accessing to the game, is performed. In this battle game, the first user generally cannot perform any operational input that can be influential to a battle result, which is unfavorable to the first user. On the other hand, according to this game control device, the first user can associate each of the plurality of object groups with a group type that can be one of the second user, so that his or her group that is effective with respect to the group type of the second user is selected. Therefore, imbalance is reduced for the first user in the battle game against the second user.

In this game control device, the determiner is configured to determine the group type of the object group of the second user, based on at least one selected from a registration information of the second user, and an object or a combination of objects included in the object group of the second user.

"Registration information" is information that can be influential to capability of the object group of the second user in the battle game among information registered in the game with respect to the first user. For example, in the case in which a user registers his or her user characteristics that exhibits an effect in the battle game, registered user characteristics is an example of the registration information. According to the determination described above, the group type of the object group of the second user is properly determined based on information that can be influential to capability of the object group of the second user in the battle game.

In this game control device, the setter is configured to vary a number of the plurality of object groups, each possible to be set, depending on a progression status of the first user.

"Progression status of the first user" indicates a status regarding progression by the first user in the game, such as a degree of progression (for example, a progression level or a stage in the game) or progression speed in the game. Here, the degree of progression in the game is not necessarily a degree of progression in the battle game between users. In the case in which a plurality of game elements such as a battle and a quest in a single game, the degree of progression in the game may be one for any game element other than the battle (for example, the quest).

In the case in which a number of settable object groups increases as a degree of progression in a game becomes high, a first user is motivated to make the degree of progression high in the game such that execution of a battle game is favorable to the first user. Further, in the case in which a number of settable object groups increases as progression speed in a game becomes faster, a first user is motivated to advance the game continuously such that execution of a battle game is favorable to the first user. That is, in the case in which the game is not progressed after the degree of progression becomes high, a number of settable object groups decreases. Therefore, a first user is motivated to advance the game continuously such that a number of settable object groups does not decrease.

In this game control device, the executor is configured to execute the battle game irrespective of whether the first user is logged in to the battle game, and the determiner is configured to determine the group type of the object group of the second user while the first user is logged in to the battle game.

If the current time is within a period of time after login time of a user, it may be determined that the user is still logged in. If the current time is within a period of time after the latest access time of a user, it may be determined that the user is still logged in.

In a game in which a battle game is executed irrespective of whether a first user is logged in, it is presumed that the first user is frustrated with a situation under which the first user cannot operate with regard to the battle game even when the first user is logged in. In contrast, under such situation particularly, the battle game is executed based on a proper group that the first user has set from the plurality of object groups according to the above configuration. Thereby, frustration of the first user can be eased.

In this game control device, the associator is configured to vary a number of group types, each possible to be associated with each of the plurality of object groups, depending on progression status of the first user.

According to this configuration, as the first user progresses farther, the first user can deal with more group types of the second user, which puts the first user has more advantageous position. Thereby, the first user is motivated to progress the game. Further, in the case in which a number of settable group types increases as a first user progress the game faster, the first user is motivated to advance the game continuously so that execution of the battle game is favorable to the first user.

In this game control device, the associator is configured to associate each of the plurality of object groups with the group type selected from a plurality of group types, based on input information by the first user.

Each of the plurality of object groups is associated with a group type based on the input by the first user. Thereby, the first user is motivated to set a proper object group with respect to a group type of the object group of the second user by, for example, selecting an object to be included in each object group.

A second aspect of the present invention is a game control method including:

correlating plurality of objects with each of a plurality of users including a first user and a second user;

setting a plurality of object groups including more than one object selected from the plurality of objects correlated with each of the plurality of users for each of the plurality of users;

associating each of the plurality of object groups set by the setting, with a group type;

executing a battle game between an object group of the first user and an object group of the second user;

determining a group type of the object group of the second user before the battle game is executed; and selecting an object group of the first user from the plurality of object groups set for the first user, the object group of the first user applied to the battle game, the object group of the first user associated with the group type that is determined by the determining.

A third aspect of the present invention is a non-transitory computer-readable recording medium containing a program for enabling a computer to perform a method, the method according to the game control method described above. An example of such recording medium is DVD-ROM and CD-ROM.

A fourth aspect of the present invention is a game system including a communication terminal and a server accessible from the communication terminal, the game system including:

a correlator configured to correlate a plurality of objects with each of a plurality of users including a first user and a second user;

a setter configured to set a plurality of object groups including more than one object selected from the plurality of objects correlated with each of the plurality of users for each of the plurality of users;

an associator configured to associate each of the plurality of object groups set by the setter, with a group type;

an executor configured to execute a battle game between an object group of the first user and an object group of the second user;

a determiner configured to determine a group type of the object group of the second user before the battle game is executed; and a selector configured to select an object group of the first user from the plurality of object groups set for the first user, the object group of the first user applied to the battle game, the object group of the first user associated with the group type that is determined by the determiner.

What is claimed is:

1. A game control device comprising:
a processor; and
a memory configured to record a plurality of objects in association with each of a plurality of users including a first user and a second user,
the processor being configured to:
set, for each of the plurality of users, a plurality of object groups including more than one object selected from the plurality of objects associated with each of the plurality of users;
associate each of the plurality of object groups that has been set, with a group type;
execute a battle game between an object group of the first user and an object group of the second user, such that during the battle game, the processor monitors progress of the battle game and reports the progress of the battle game to the first user and the second user;
determine a group type of the object group of the second user before the battle game is executed; and
select the object group of the first user from the plurality of object groups set for the first user, the object group of the first user applied to the battle game, and the object group of the first user associated with the group type that is determined.

2. The game control device according to claim 1, wherein the processor is configured to determine the group type of the object group of the second user, based on at least one selected from a registration information of the second user, and an object or a combination of objects included in the object group of the second user.

3. The game control device according to claim 1, wherein the processor is configured to vary a number of the plurality of object groups, each possible to be set, depending on a progression status of the first user.

4. The game control device according to claim 2, wherein the processor is configured to vary a number of the plurality of object groups, each possible to be set, depending on a progression status of the first user.

5. The game control device according to claim 1, wherein
the processor is configured to execute the battle game irrespective of whether the first user is logged in to the battle game, and
the processor is configured to determine the group type of the object group of the second user while the first user is logged in to the battle game.

6. The game control device according to claim 2, wherein
the processor is configured to execute the battle game irrespective of whether the first user is logged in to the battle game, and
the processor is configured to determine the group type of the object group of the second user while the first user is logged in to the battle game.

7. The game control device according to claim 3, wherein
the processor is configured to execute the battle game irrespective of whether the first user is logged in to the battle game, and
the processor is configured to determine the group type of the object group of the second user while the first user is logged in to the battle game.

8. The game control device according to claim 4, wherein
the processor is configured to execute the battle game irrespective of whether the first user is logged in to the battle game, and
the processor is configured to determine the group type of the object group of the second user while the first user is logged in to the battle game.

9. The game control device according to claim 1,
wherein the processor is configured to vary a number of group types, each possible to be associated with each of the plurality of object groups, depending on progression status of the first user.

10. The game control device according to claim 2,
wherein the processor is configured to vary a number of group types, each possible to be associated with each of the plurality of object groups, depending on progression status of the first user.

11. The game control device according to claim 3,
wherein the processor is configured to vary a number of group types, each possible to be associated with each of the plurality of object groups, depending on progression status of the first user.

12. The game control device according to claim 4,
wherein the processor is configured to vary a number of group types, each possible to be associated with each of the plurality of object groups, depending on progression status of the first user.

13. The game control device according to claim 1,
wherein the processor is configured to associate each of the plurality of object groups with the group type selected from a plurality of group types, based on input information by the first user.

14. The game control device according to claim 2,
wherein the processor is configured to associate each of the plurality of object groups with the group type selected from a plurality of group types, based on input information by the first user.

15. The game control device according to claim 3,
wherein the processor is configured to associate each of the plurality of object groups with the group type selected from a plurality of group types, based on input information by the first user.

16. The game control device according to claim 4,
wherein the processor is configured to associate each of the plurality of object groups with the group type selected from a plurality of group types, based on input information by the first user.

17. The game control device according to claim 11, wherein the processor is configured to associate each of the plurality of object groups with the group type selected from a plurality of group types, based on input information by the first user.

18. A game control method comprising:
recording in a memory a plurality of objects in association with each of a plurality of users including a first user and a second user;
setting, by a processor for each of the plurality of users, a plurality of object groups including more than one object selected from the plurality of objects correlated with each of the plurality of users;
associating, by the processor, each of the plurality of object groups set by the setting, with a group type;
executing, by the processor, a battle game between an object group of the first user and an object group of the second user, such that during the battle game, the processor monitors progress of the battle game and reports the progress of the battle game to the first user and the second user;
determining, by the processor, a group type of the object group of the second user before the battle game is executed; and
selecting, by the processor, the object group of the first user from the plurality of object groups set for the first user, the object group of the first user applied to the battle game, and the object group of the first user associated with the group type that is determined.

19. A non-transitory computer-readable recording medium containing a program for enabling a computer to perform the method according to claim 18.

20. A game system including a communication terminal and a server accessible from the communication terminal, the game system comprising:
a processor; and
a memory configured to record a plurality of objects in association with each of a plurality of users including a first user and a second user,
the processor being configured to:
set, for each of the plurality of users, a plurality of object groups including more than one object selected from the plurality of objects associated with each of the plurality of users;
associate each of the plurality of object groups that has been set, with a group type;
execute a battle game between an object group of the first user and an object group of the second user, such that during the battle game, the processor monitors progress of the battle game and reports the progress of the battle game to the first user and the second user;
determine a group type of the object group of the second user before the battle game is executed; and
select the object group of the first user from the plurality of object groups set for the first user, the object group of the first user applied to the battle game, and the object group of the first user associated with the group type that is determined.

* * * * *